United States Patent
Stuck et al.

(10) Patent No.: US 9,937,747 B2
(45) Date of Patent: Apr. 10, 2018

(54) ELASTOMERIC FASTENER SYSTEM FOR WHEEL DEVICES

(71) Applicant: Hutchinson S.A., Paris (FR)

(72) Inventors: Larry W. Stuck, Amherst, NY (US); Colin Gehris Vogel, Cheektowaga, NY (US); Charles Joseph Tabone, North Tonawanda, NY (US)

(73) Assignee: HUTCHINSON S.A., Paris (FR)

( * ) Notice: Subject to any disclaimer, the term of this patent is extended or adjusted under 35 U.S.C. 154(b) by 0 days.

(21) Appl. No.: 14/446,776

(22) Filed: Jul. 30, 2014

(65) Prior Publication Data

US 2015/0035345 A1    Feb. 5, 2015

Related U.S. Application Data

(60) Provisional application No. 61/859,857, filed on Jul. 30, 2013.

(51) Int. Cl.
*B60B 7/10* (2006.01)
*B60B 7/06* (2006.01)

(52) U.S. Cl.
CPC .............. *B60B 7/10* (2013.01); *B60B 7/065* (2013.01); *B60B 2360/50* (2013.01); *B60B 2900/212* (2013.01)

(58) Field of Classification Search
CPC .. B60B 7/04; B60B 7/12; B60B 7/065; B60B 7/10; B60B 2360/50; B60B 2900/212
USPC ................. 301/37.102, 37.36, 37.32, 37.109
See application file for complete search history.

(56) References Cited

U.S. PATENT DOCUMENTS

| | | | |
|---|---|---|---|
| 2,303,854 A | 12/1942 | Lyon | |
| 2,634,704 A | 4/1953 | Morrison | |
| 2,637,240 A | 5/1953 | McClellan | |
| 3,092,175 A | 6/1963 | Suessle | |
| 3,651,545 A | 3/1972 | Hara | |
| 4,210,367 A * | 7/1980 | Spisak | B60B 7/068 24/296 |
| 4,252,169 A | 2/1981 | Watts | |
| 4,318,436 A | 3/1982 | Shurman | |
| 4,351,865 A | 8/1982 | Watts | |
| 4,472,097 A * | 9/1984 | Kiefer | B60Q 1/0433 36/134 |
| 4,635,325 A | 1/1987 | Yagi | |
| 4,790,605 A | 12/1988 | Stalter, Sr. | |
| 4,792,191 A | 12/1988 | Farmer | |

(Continued)

FOREIGN PATENT DOCUMENTS

| | | |
|---|---|---|
| EP | 0149935 A2 | 7/1985 |
| GB | 2111579 | 7/1983 |
| GB | 2387873 | 10/2003 |

OTHER PUBLICATIONS

International Search Report for corresponding International Application No. PCT/US2014/48816 dated Nov. 14, 2014.

(Continued)

*Primary Examiner* — Hau V Phan
(74) *Attorney, Agent, or Firm* — K&L Gates LLP

(57) ABSTRACT

A system. The system includes a wheel, a protective device and a fastener system. The fastener system is connected to the wheel and the protective device. The fastener system includes an elastomeric fastener configured to allow for controlled radial and rotational displacement of the protective device relative to the wheel in x and y directions.

21 Claims, 25 Drawing Sheets

(56) References Cited

U.S. PATENT DOCUMENTS

| | | |
|---|---|---|
| 5,524,972 A | 6/1996 | Cailor et al. |
| 5,531,508 A | 7/1996 | Bell, III |
| 6,120,047 A * | 9/2000 | Axelson .................. A61G 5/02 |
| | | 280/250.1 |
| 6,257,675 B1 | 7/2001 | Leynaert |
| 6,467,852 B1 | 10/2002 | Polka |
| 6,641,225 B1 | 11/2003 | Amodeo, Jr. |
| 6,688,703 B1 | 2/2004 | Wang |
| 6,712,432 B1 | 3/2004 | Cheng |
| 6,726,290 B1 | 4/2004 | Yue |
| 6,860,568 B2 | 3/2005 | Nunes |
| 6,895,980 B2 | 5/2005 | Roshorough |
| 6,932,434 B2 | 8/2005 | Wang |
| 7,805,816 B1 | 10/2010 | Thorne, III et al. |
| 8,061,400 B2 | 11/2011 | Landers et al. |
| 8,276,992 B2 | 10/2012 | Smith |
| 8,328,294 B2 | 12/2012 | Byers et al. |
| 8,590,121 B1 * | 11/2013 | Patt, Jr. ................ A43B 3/0078 |
| | | 24/713.1 |
| 2004/0045147 A1 * | 3/2004 | Swanstrom ............... F16B 2/04 |
| | | 29/235 |
| 2004/0179920 A1 * | 9/2004 | Ando .................... F16B 33/006 |
| | | 411/501 |
| 2005/0040696 A1 | 2/2005 | Chiu |
| 2006/0239797 A1 * | 10/2006 | Evanbar ................ F16B 5/0241 |
| | | 411/542 |
| 2007/0013226 A1 | 1/2007 | Updegraph |
| 2008/0136247 A1 | 6/2008 | Janty |
| 2010/0007197 A1 | 1/2010 | Pascal |
| 2012/0043804 A1 | 2/2012 | Nebel |
| 2013/0334869 A1 | 12/2013 | Kronemeyer |

OTHER PUBLICATIONS

International Preliminary Report on Patentability dated Feb. 2, 2016 for corresponding International Application PCT/US2014/048816.
Supplementary European Search Report for Application No. 14832724, dated Feb. 17, 2017 (7 pages).

* cited by examiner

FIG. 1 - Prior Art

ELASTOMERIC FASTENER SYSTEM FOR WHEEL DEVICES

CROSS-REFERENCE TO RELATED APPLICATION

This application claims the benefit under 35 U.S.C. § 119(e) of the earlier filing date of U.S. Provisional Patent Application No. 61/859,857 filed on Jul. 30, 2013.

BACKGROUND

This application discloses an invention which is related, generally and in various embodiments, to an elastomeric fastener system for wheel devices. The elastomeric fastener system may be utilized to mount protective devices to wheels.

It has been shown that various devices can be attached to vehicle wheels by different fastening methods to provide specific protection to the wheels or tire sidewalls of the vehicle. Examples of such devices include tire shields and wheel covers. Tire shields are used to protect the sidewall of the tire against severe abrasion and damage associated with contact with rocks, curbs, trees or other damaging objects. Tire shields have been designed with various mechanical properties and design features to prevent puncture of the sidewall and subsequent tire deflation, and a range of elastomeric materials have been utilized to provide specific benefits based on the demands of the end application. Specific formulations have been utilized to enhance puncture resistance, abrasion resistance, tear and cut resistance, impact resistance, fire retardance or other properties required by specific applications. Different elastomeric formulations have been engineered to provide the protection required on an application by application basis. Tire shields designed for military protection, for example, generally require greater cut and tear resistance associated with impact of these vehicles with sharp, heavy objects. Tire shields used for riot control generally include fire retardance needed to prevent degradation when exposed to Molotov cocktails or other incendiary devices.

Wheel covers are used to protect wheel components from damage. Such covers include protective covers that protect the wheel bolts used for mounting the wheels to the vehicle and the central tire inflation system (CTIS) valve. Wheel covers have also been designed to reduce or camouflage the thermal signature of the wheels to reduce enemy detection in military combat situations.

Mounting of these types of devices to wheels must be done in a manner that does not adversely affect balancing of the tires or other performance criteria of the wheels or tires. Permanent deformation of the tire shield or wheel cover, for example, impacts both the balance of the wheel and aesthetic appearance. Ifs important that the mechanism utilized to fasten such devices to the wheel minimizes damage to the protective device during operation.

It is known to use rigid fastening systems to secure devices such as tire shields and/or wheel covers to wheels of a vehicle. Rigid fastening systems typically include bolts and rigid retainers that are not capable of adjusting and relieving the mechanical stresses induced on the secured devices. As a result, it is the tire shields and/or wheel covers which are forced to absorb the majority of the energy when subjected to an impact event. This can lead to distortion or damage to the devices that reduces their effectiveness or leads to complete device failure. An example of a known rigid fastening system is shown in FIG. 1 where a tire shield device is mounted to the wheel with wheel bolts and extends over the sidewall of a tire.

In other known attachment mechanisms, the wheel devices can be geometrically altered to better adjust to induced stresses. For example, devices have been built with shingled construction to achieve this result. While this is effective in some instances, as the geometry becomes more complicated, the cost of tooling used to manufacture the devices typically increases. It is also known to include mechanical springs in the fastener system to provide some degree of device movement. These latter devices are generally more expensive, harder to maintain and do not lend themselves to easy field repair or replacement.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
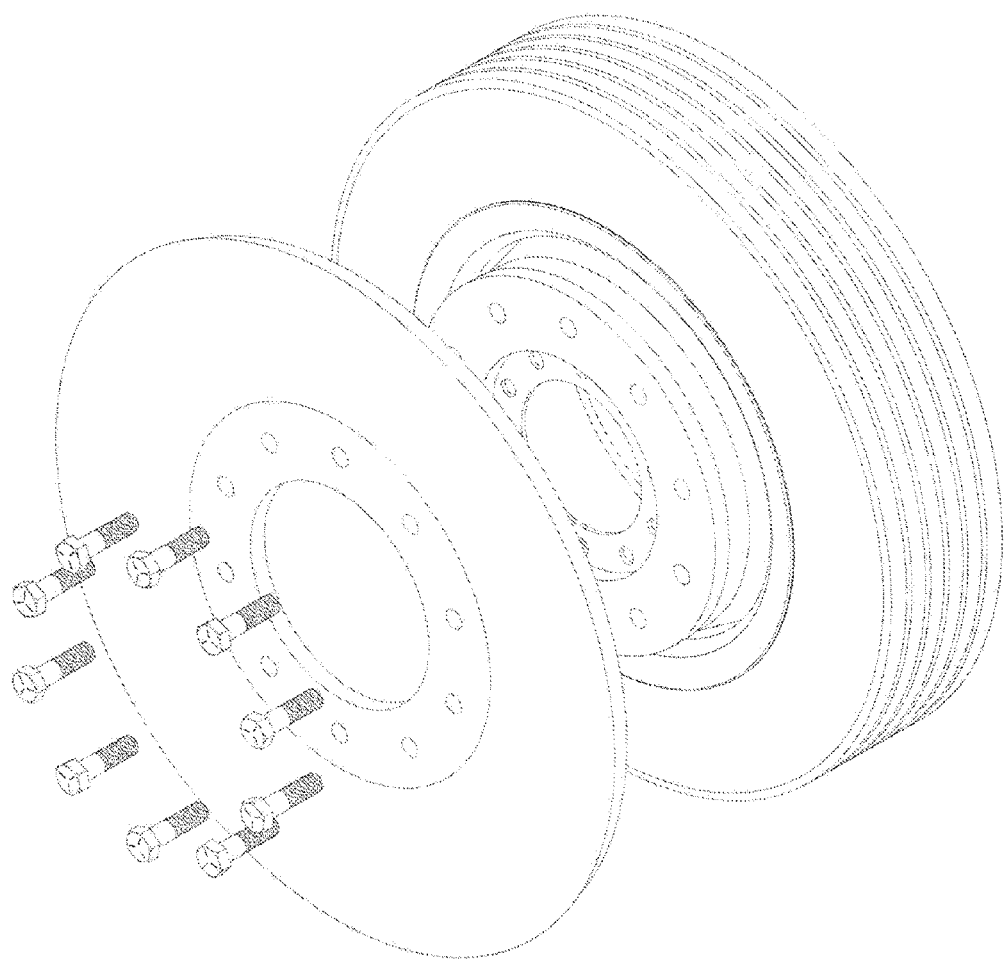
FIG. 1 illustrates a known rigid fastening system.
Figure 2:
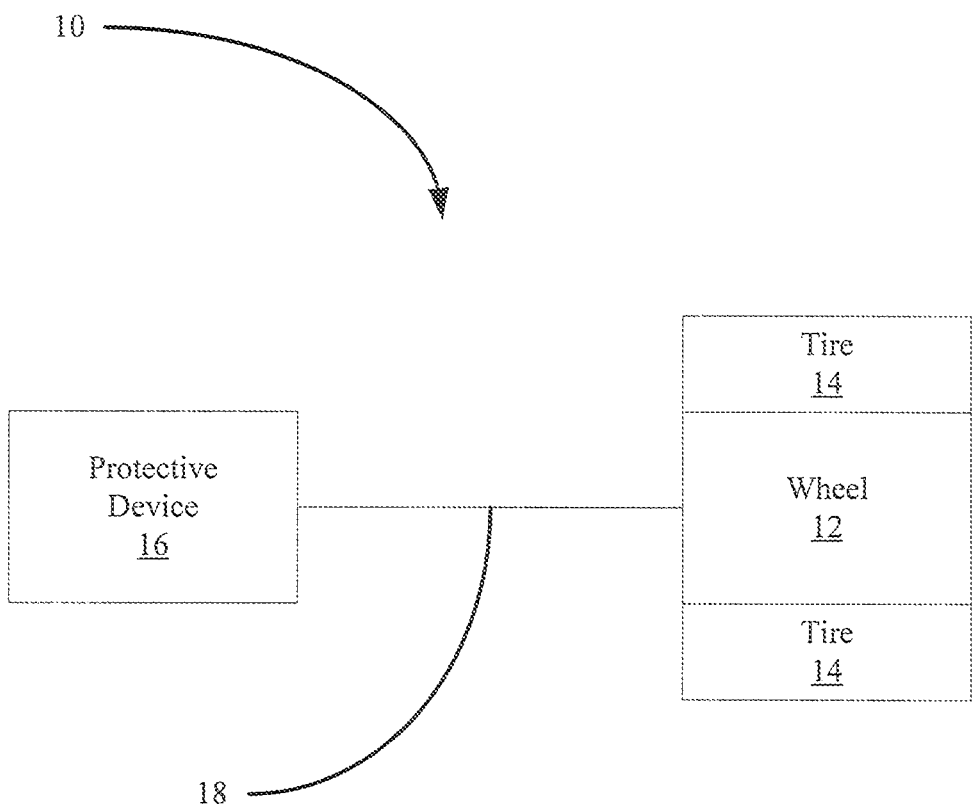
FIG. 2 illustrates a high-level representation of a system according to various embodiments.

FIG. 2 illustrates a high-level representation of a system 10 according to various embodiments. The system 10 includes a wheel 12, a tire 14 mounted on the wheel 12, a protective device 16 and a fastener system 18 connected to the wheel 12 and to the protective device 16. The wheel 12 may be any suitable type of wheel. For example, according to various embodiments, the wheel 12 is a single-piece wheel. According to other embodiments, the wheel 12 may be a multi-piece wheel such as, for example, a two-piece wheel. As described in more detail hereinafter, the wheel 12 may include a plurality of lightening holes 20 (See FIGS. 4 and 5). The protective device 16 may be any suitable type of protective device. For example, according to various embodiments, the protective device 16 may be a tire shield, a wheel cover, etc. Although only one protective device 16 is shown for purposes of simplicity in FIG. 2, it will be appreciated that the system 10 may include any number of different protective devices 16 or combinations thereof (e.g., a tire shield and a wheel cover).

Figure 3:
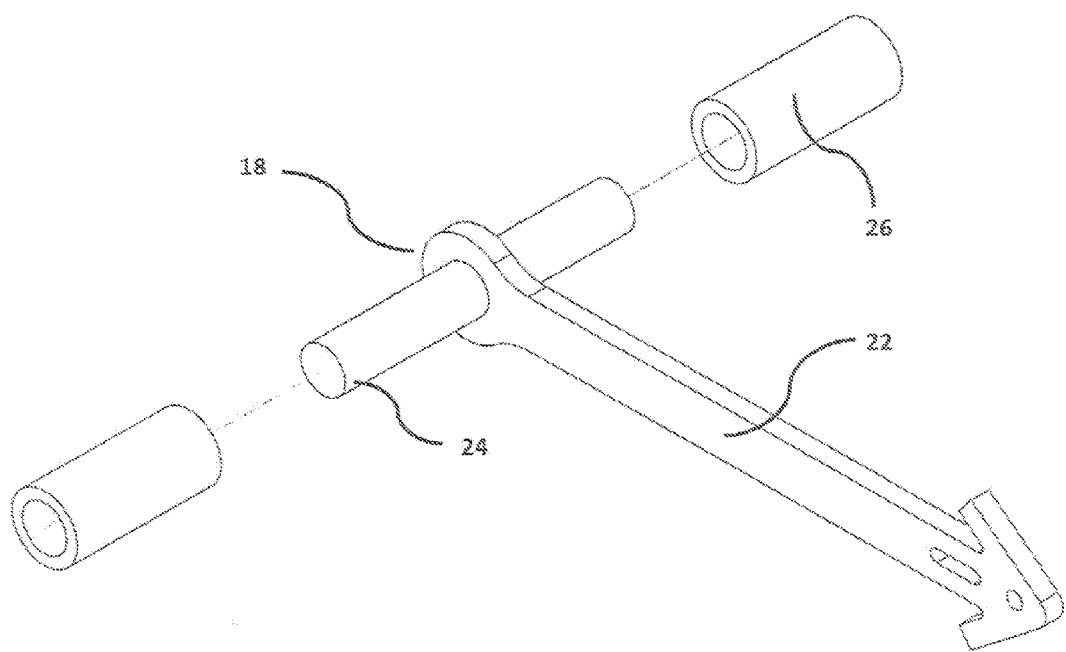
FIG. 3 shows components of a fastener system of the system of FIG. 2 according to various embodiments.

FIG. 3 illustrates components of the fastener system 18 according to various embodiments. The fastener system 18 may be utilized to mount the protective device 16 to a wide range of vehicle wheels 12, and includes an elastomeric fastener 22. The fastener system 18 shown in FIG. 3 may also include a retainer rod 24 and a cover member 26. As described in more detail hereinbelow, the fastener system 18 is configured to allow for controlled radial and rotational displacement of the protective device 16 relative to the wheel 12 in the x and y directions, and may also be configured to allow for controlled axial displacement of the protective device relative to the wheel 12 in the z direction (e.g., x, y and z represent an ordered triplet of lines (axes) that are pair-wise perpendicular, have a single unit of length for all three axes and have an orientation for each axis). The radial displacement may refer to displacement in the x and/or y directions relative to the wheel 12, and the rotational displacement may refer to rotation of the protective device 16 in the x-y plane relative to the wheel 12. The axial displacement may refer to displacement in the z direction relative to the wheel 12. The fastener system 18 allows for independent radial and rotational displacement of the protective device 16 relative to the wheel 12 during interference with curbs, rocks or other road objects. This variable displacement improves the effectiveness of the protective device 16 and minimizes damage associated with abrasion or distortion during collision events. Although only one elastomeric fastener 22, one retainer rod 24 and two cover members 26 are shown in FIG. 3 for purposes of simplicity, it will be appreciated that the fastener system 18 may include a plurality of elastomeric fasteners 22, a plurality of corresponding retainer rods 24 (e.g., one per fastener 22), and a plurality of cover members 26. (See FIGS. 4 and 5).

According to various embodiments, the elastomeric fastener 22 has the ability to flex (stretch etc.) over an extended range of elongation from approximately −20° F. to approximately 180° F., which allows the elastomeric fastener 22 to reliably and repeatedly return to shape over a relatively wide range of temperatures. The elastomeric fastener 22 also has the ability to twist and/or rotate. The elastomeric fastener 22 is fabricated with material properties that prevent the elastomeric fastener 22 from exceeding the material strain at yield during actual use. This allows the elastomeric fastener 22 to reliably and repeatedly return to shape over a relatively wide range of temperatures. Examples of appropriate materials which comprise the elastomeric fastener 22 include rubbers such as ethylene propylene diene monomer (EPDM) or silicone or other selected elastomers that include urethane or a variety of other similar materials. According to various embodiments, the elastomeric fastener 22 may include a thermoplastic or thermoset material. The elastomeric fasteners 22 cooperate with one another to allow the protective device 16 to experience an extended range of motion when the protective device 16 is subjected to collision events such as curb strikes or similar high impact events. By stretching and compensating for the collision event, the protective device 16 experiences less damage because the impingement and abrasion forces that could otherwise cause buckling, bending or tearing of the protective device 16 are reduced. The fastener system 18 simplifies installation of the protective device 16 and enables field repair or removal of the protective device 16 as needed. The elastomer fasteners 22 also provide compliance to the protective device 16.

The retainer rod 24 may be any suitable type of retainer rod (e.g., a metal rod, a plastic rod, etc.) and is utilized to connect the elastomeric fastener 22 to the wheel 12. To connect the elastomeric fastener 22 to the wheel 12, the retainer rod 24 is inserted through the opening of the circular-shaped base of the elastomeric fastener 22 of FIG. 3. The circular-shaped base of the elastomeric fastener 22 and the retainer rod 24 are then inserted through a lightening hole 20 in the wheel 12 (See FIGS. 4 and 5) from the "outboard" side to the "inboard" side. The retainer rod 24 is then rotated to form a "T" which connects the elastomeric fastener 22 to the wheel 12. In some applications, the retainer rod 24 can be eliminated by utilizing an elastomeric fastener 22 which provides the functionality of the retainer rod 24. For example, a "double-headed" elastomeric fastener 22 (See FIGS. 9A-9C) can be utilized to secure the protective device 16 to the wheel 12 utilizing the webbing/body of the elastomeric fastener 22 positioned between the lightening holes 20.

The cover member 26 is utilized to cover the retainer rod 24. The cover member 26 is fabricated from rubber or alternative elastomeric materials, and helps prevent the retainer rod 24 from causing any damage to the wheel 12.

Figure 4:
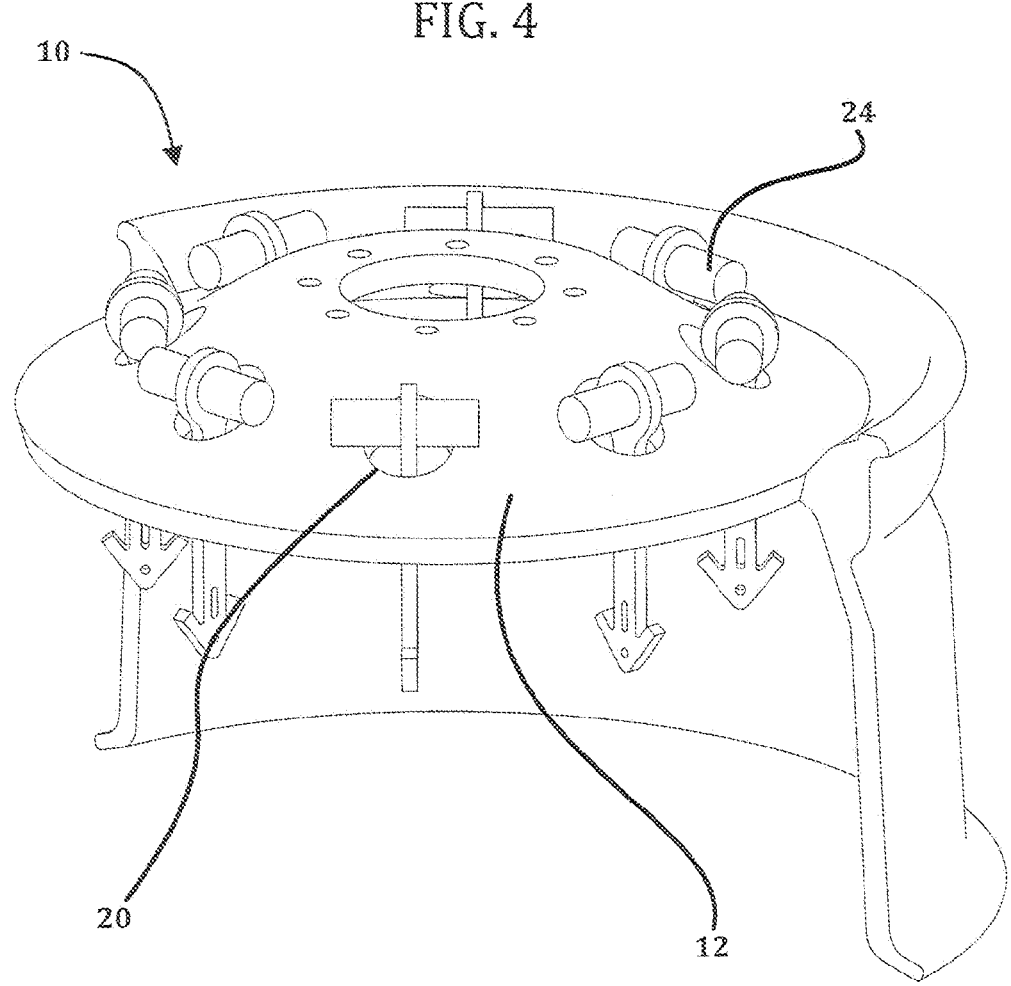
FIGS. 4 and 5 illustrate an installed inboard view and an outboard view of the fastener system of FIG. 3 according to various embodiments.

FIG. 4 illustrates an "inboard" view of the installed fastener system 18 of FIG. 3 according to various embodiments. A plurality of elastomeric fasteners 22 having corresponding retainer rods 24 inserted through the openings of the circular-shaped bases of the elastomeric fasteners 22 have been inserted through lightening openings 20 in the wheel 12 (from the "outboard" side to the "inboard" side). The retainer rods 24 were then rotated to form a "T" which connects the circular-shaped bases of the elastomeric fasteners 22 to the wheel 12.

Figure 5:
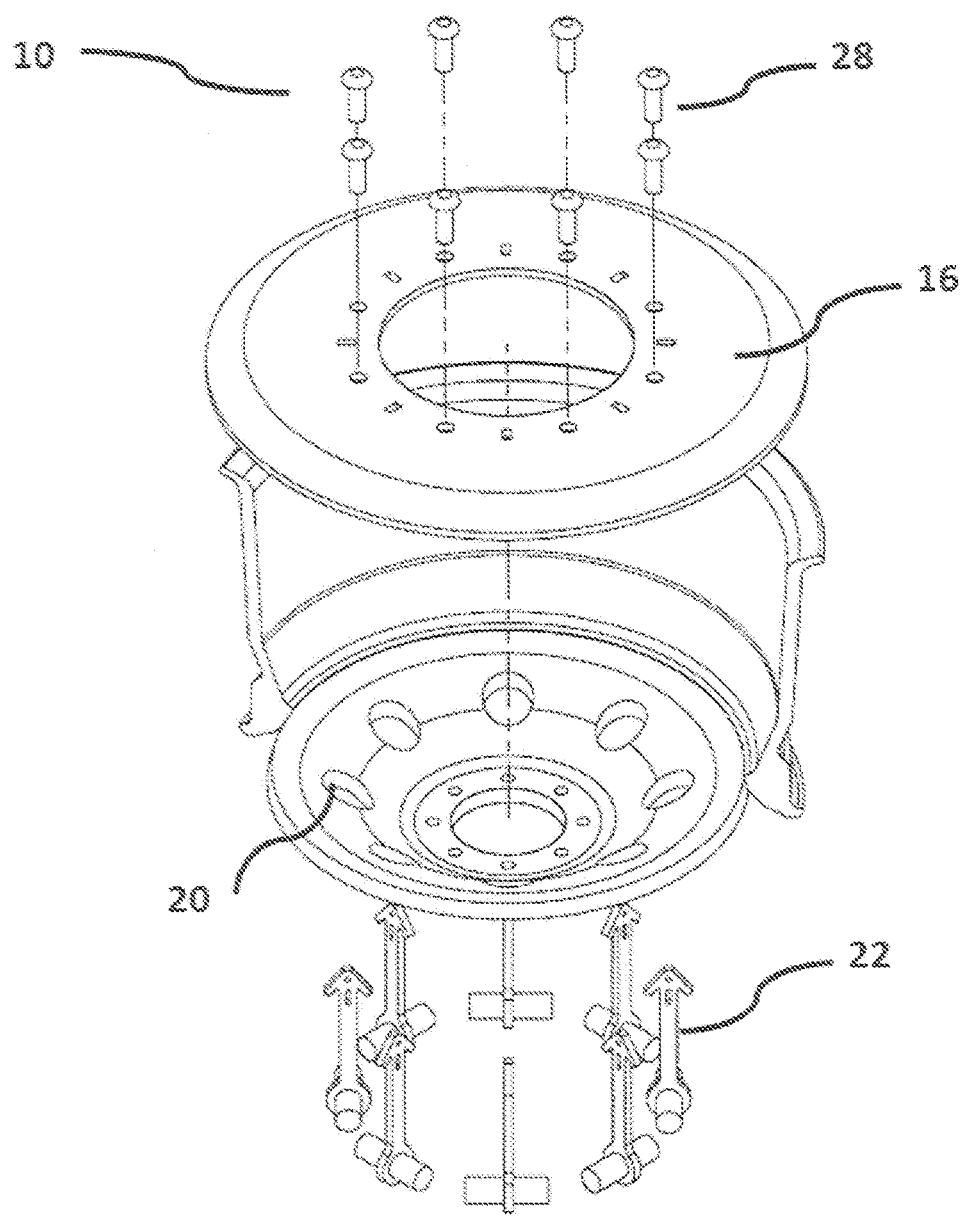

FIG. 5 illustrates an "outboard" view of the installed fastener system 18 of FIG. 3 according to various embodiments. After the elastomeric fasteners 22 and the retainer rods 24 are connected to the wheel 12, the heads (e.g., the "A"-shaped heads) of the elastomeric fasteners 22 are inserted through respective openings in the protective device 16 (from the "inboard" side to the "outboard" side) and "snapped" into place. The "A" shaped heads of the elastomeric fasteners 22 can be "squeezed" and compressed to insert the elastomeric fasteners 22 through the openings in the protective device 16. The heads of the elastomeric fasteners 22 are stretched under tension during insertion through the openings of the protective device 16. The circular opening in the head of the elastomeric fasteners 22 facilitates squeezing and provides a means of using a screw driver or other similar instrument to simplify installation. Of course, according to other embodiments, the opening in the head of the elastomeric fasteners 22 can be a shape other than circular. When a given elastomeric fastener 22 is in place and the squeezing force is removed, the elastomeric fastener 22 is effectively snapped into place and the elastomeric fastener 22 remains in tension. A broken elastomeric fastener 20 will remain attached to the protective device 16. According to various embodiments, the visual appearance of the elastomeric fastener 20 can be enhanced for applications where aesthetics are critical to the customer application. For example, according to various embodiments, colored or cosmetically attractive fasteners 22 can be created by overcoating or pigmenting the elastomeric fasteners 22 to improve their appearance. According to other embodiments, the fastener system 18 can include one or more aesthetically attractive sleeves or cover members which can be utilized to cover the elastomeric fasteners 22 to improve the appearance of the fastener system 18 by hiding the elastomeric fasteners 22 from view.

Also, although only one protective device 16 (a tire shield) is shown in FIGS. 4 and 5, it will be appreciated that the fastener system 18 may be utilized to mount any number of different protective devices 16 (e.g., a tire shield and a wheel cover) to a wide range of vehicle wheels 12. To ensure the protective device 16 will self-center after a collision, self-aligning locating standoff pegs 28 (e.g., cylindrical-shaped members) can be inserted through openings of the protective device 16 as shown in FIG. 5. These standoff pegs 28 are seated on the inner wheel flange surface and function as stops for the protective device 16 during impact events. The standoff pegs 28 may be fabricated from any suitable material (e.g., a durable plastic) and are described in more detail hereinbelow with respect to FIGS. 19 and 20.

Figure 6A:
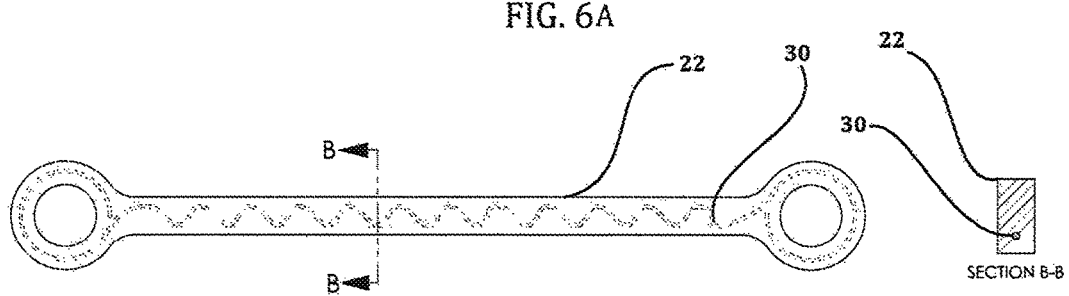
FIGS. 6A-8 illustrate various embodiments of the elastomeric fasteners of the fastener system of the system of FIG. 2.

It will be appreciated that if the elastomeric fastener 22 is over-extended in extreme conditions, the yield strain or break strain of the fastener 22 can be exceeded, possibly resulting in deformation or breaking of the fastener 22. FIGS. 6A-8 illustrate various embodiments of the elastomeric fastener 22 and/or fastener system 18 which help prevent this from occurring. As shown in the plan view and cross-section of FIG. 6A, according to various embodiments, an extension limiting member 30 is embedded within the elastomeric fastener 22. The extension limiting member 30 may be of any suitable type of extension limiting member or apparatus. For example, for the embodiments shown in FIG. 6A, the extension limiting member 30 is shown as a metal wire (or an inelastic fabric) 30 configured in a worm-like pattern. When the elastomeric fastener 22 is placed into operational mode, the elastomeric fastener 22 and the wire or fabric 30 within the fastener 22 both extend. Ultimate extension is limited when the wire or fabric 30 reaches its extension limit. The wire or inelastic fabric 30 provides a mechanical stop that prevents overextension beyond the limits of the elastomeric fastener 22. Although the wire or fabric 30 is shown in FIG. 6A as being in a worm-like pattern, it will be appreciated that the wire or fabric 30 may be configured in any suitable pattern.

Figure 6B:
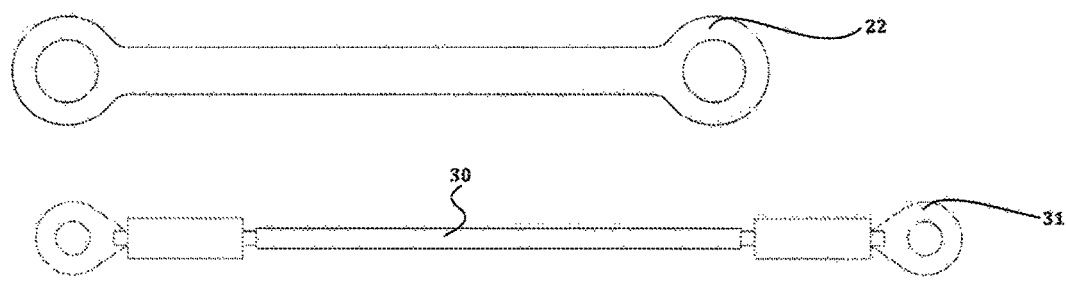

According to various embodiments, the extension limiting member 30 may be external to the elastomeric fastener 22. For example, as shown in FIG. 6B, according to various embodiments, the extension limiting member 30 is external to the elastomeric fastener 22 (shown in the upper portion of FIG. 6B) and forms part of an extension limiting apparatus 31 (shown in the lower portion of FIG. 6B) which is connected to the elastomeric fastener 22. Although for purposes of simplicity the extension limiting apparatus 31 is not shown as being connected to the elastomeric fastener in FIG. 6B, it will be appreciated that the extension limiting apparatus 31 may be connected to the elastomeric fastener 22 in any suitable manner. A more detailed description of an exemplary connection is described hereinbelow with reference to FIG. 24.

Figure 7:
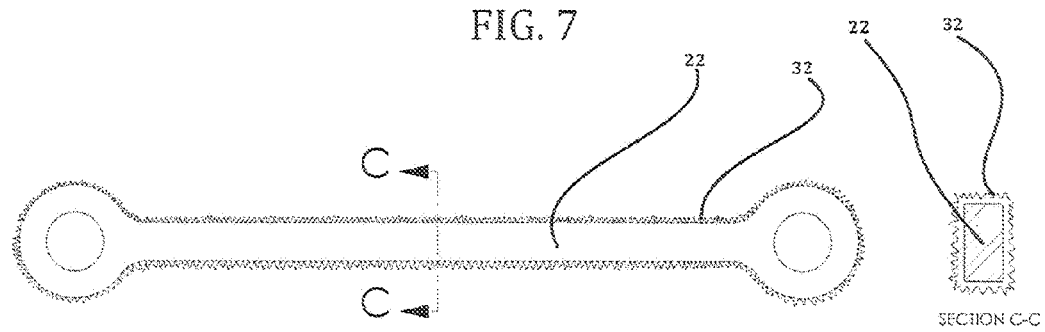

As shown in the plan view and cross-section of FIG. 7, according to various embodiments, a fabric sleeve 32 made with inelastic material such as, for example, nylon is crimped over the elastomeric fastener 22. The fabric sleeve 32 is compressed during its installation over the fastener 22. In operational mode, the fabric sleeve 32 is designed to become taut prior to reaching the elongation design limit of the elastomer fastener 22 and prevents overextension. Thus, the fabric sleeve 32 may be considered an embodiment of the extension limiting member 30.

Figure 8:
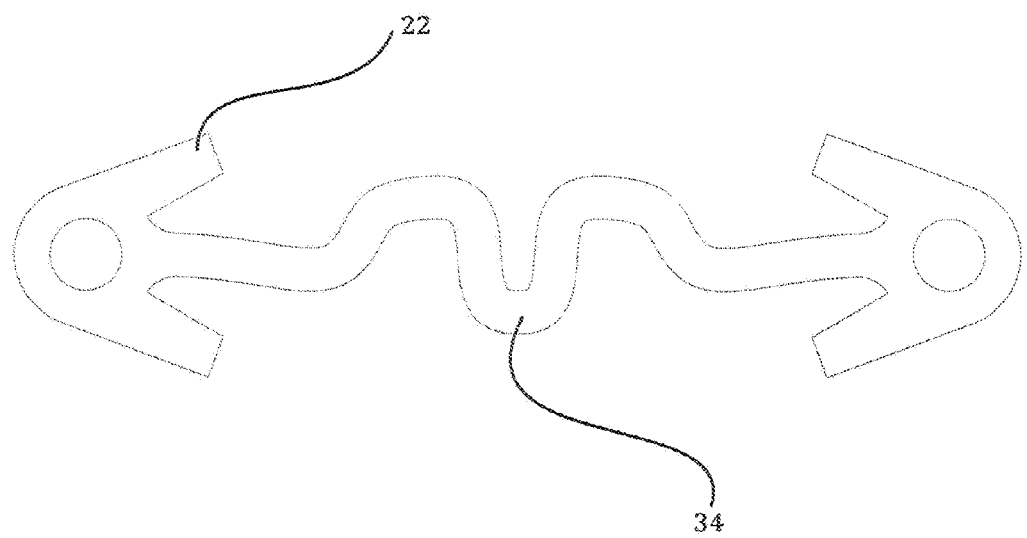

As shown in FIG. 8, according to various embodiments, the elastomeric fastener 22 can be configured to include a material accumulation (e.g., a kink) 34 that can be help control the tension force desired. The kink 34 in the fastener 22 provides a dual spring effect. An initial force is needed to remove the kink 34 in the fastener 22. A secondary force is needed to further elongate the fastener 22. According to various embodiments, a metal wire, spring, inelastic fabric or other suitable material may be embedded in the elastomeric fastener 22 at the location of the kinks 34. Although the kink 34 shown in FIG. 8 may be considered an "S"-shaped kink, it will be appreciated that the elastomeric fastener 22 may be configured to include any number of kinks 34 and the respective kinks 34 may be configured in any number of different shapes. For embodiments utilizing one or more of the kinks 34, the ultimate tension and elongation of the elastomeric fastener 22 is controlled by the elastomer used and the number of kinks 34 incorporated in the fastener 22.

Although the elastomeric fasteners 22 are shown in FIGS. 3 and 6-8 as having particular sizes and configurations (e.g., a circular-shaped base with a circular opening therethrough, an "A" shaped head with an opening therethrough, and an elongated body with slots therethrough as shown in FIG. 3), it will be appreciated that the elastomeric fasteners 22 may be of any suitable size and configuration. For example, the elastomeric fasteners 22 can be made with various geometric configurations using a singular or plurality of heads to adapt to a wide range of vehicle wheels 12 and accommodate a range of mounted protective devices 16, and the head geometry designed into the elastomeric fastener 22 can be customized to fit in various wheel lightening hole 20 configurations. It should further be noted that the specific geometry of the elastomeric fastener 22 can be altered based on specific applications. The shape and size of the openings and/or slots in the elastomeric fastener 22 can also be customized as a function of individual applications. The slits and/or holes can be configured to further optimize elongation properties of the elastomeric fastener 22. Additionally, the openings allow for compressibility of portions of the elastomeric fastener 22, and the slots make elongation of the elastomeric fastener 22 easier and allow installation of the elastomeric fastener 22 with controlled tension force. Various other embodiments and configurations of the elastomeric fasteners 22 are described in more detail hereinbelow.

Figure 9A:
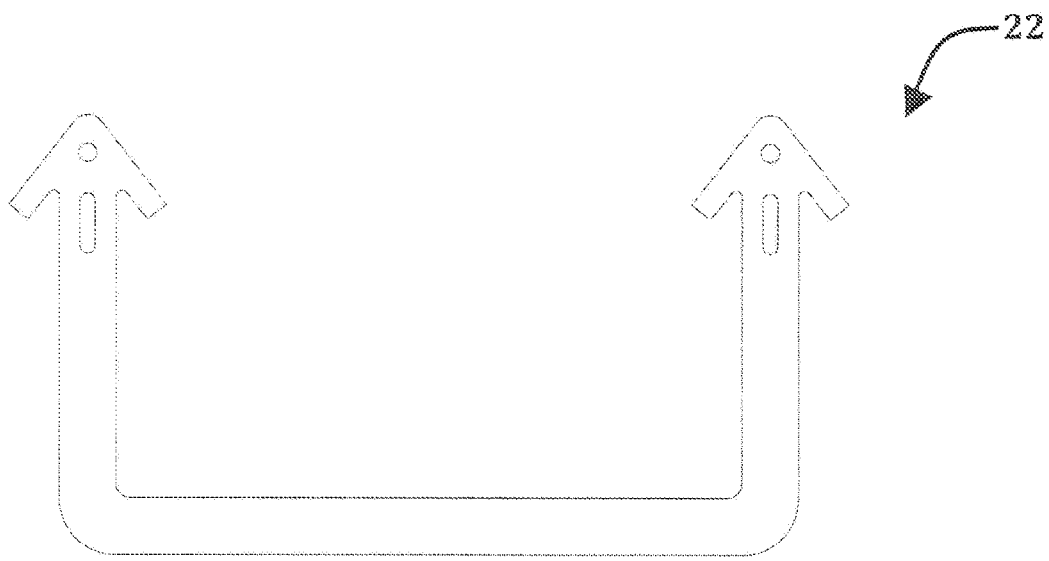
FIGS. 9A-9D illustrate various embodiments of the elastomeric fasteners of the fastener system of the system of FIG. 2.
Figure 9B:
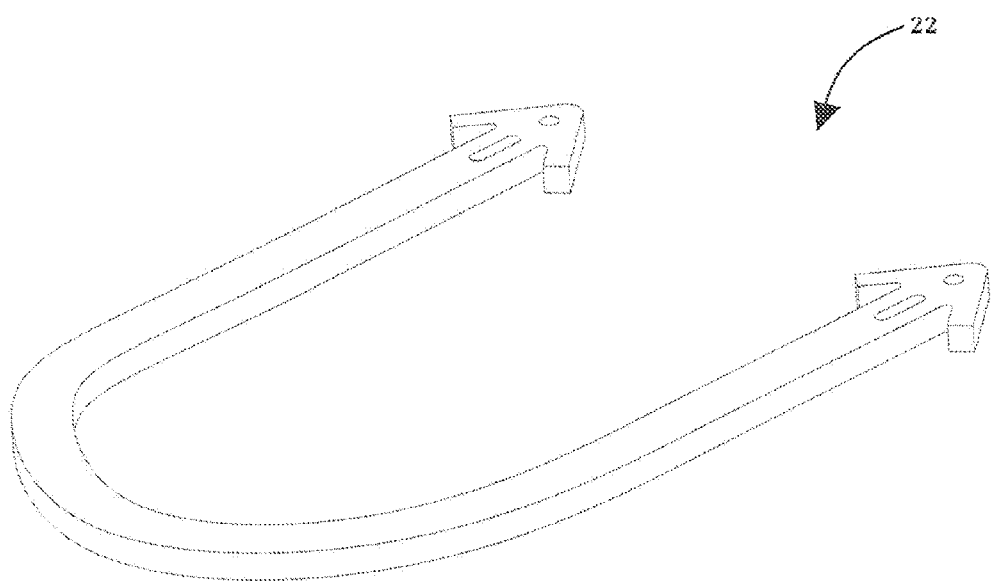
Figure 9C:
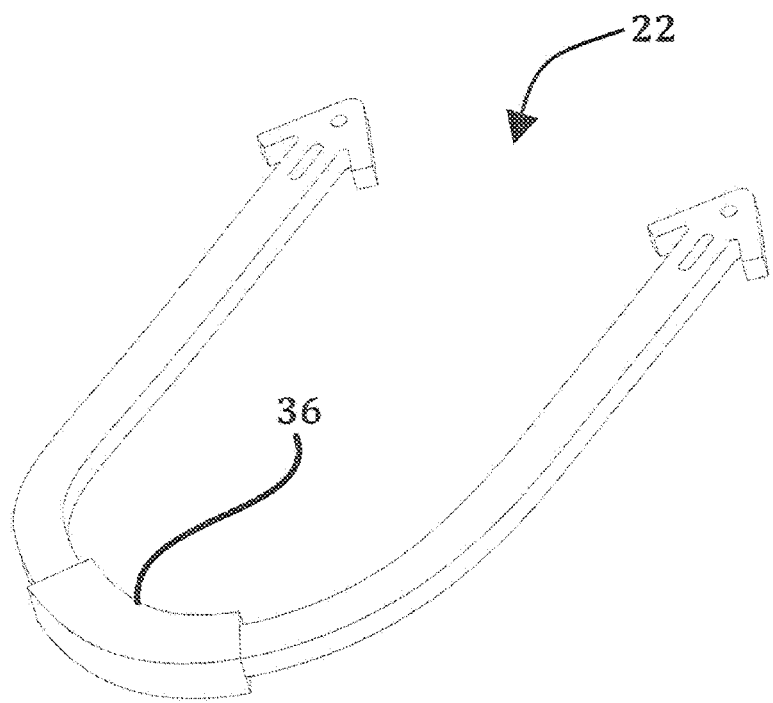
Figure 9D:
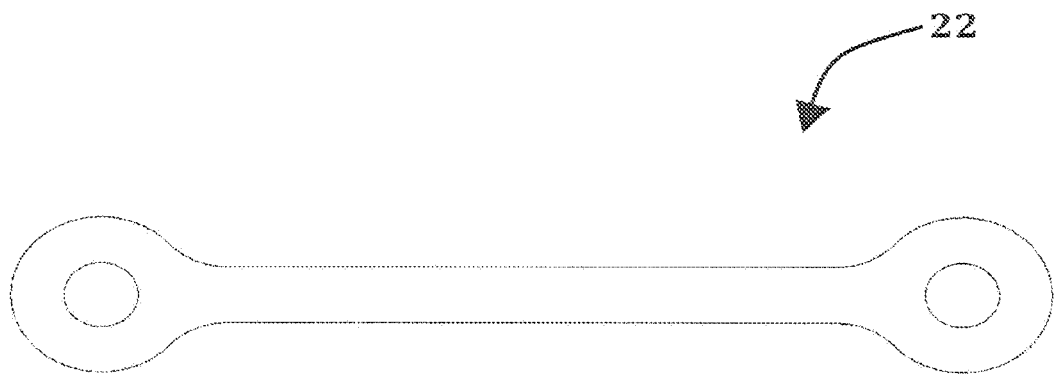

FIGS. 9A-12 illustrate other embodiments of the elastomeric fasteners 22. FIG. 9A illustrates an elastomeric fastener 20 having a "U"-shaped configuration and FIG. 9B illustrates an elastomeric fastener 20 having a "horseshoe"-shaped configuration. These configurations may be preferred to reduce fastener weight, eliminate the retainer rod 24 or to minimize the chance of the retainer rod 24 becoming dislodged during operation and left on the road. For these embodiments, the elastomeric fastener has a first end portion (an "A"-shaped head or male portion), a second portion (an "A"-shaped head or male portion) and a body portion connected to the first and second end portions. Once installed, each of the end portions are connected to the outboard side of the protection device 16, and the body portion passes through a lightening hole 20 of the wheel 12 (outboard to inboard), along the inboard side of the wheel 12, and passes through another lightening hole 20 of the wheel 12 (inboard to outboard). It will be appreciated that any part of the body portion which is in contact with the wheel 12 may be subjected to abrasion and/or tearing. To help prevent this from occurring, a cover member 36 made of abrasion and tear resistant material may be utilized as shown in FIG. 9C to protect the elastomeric fastener 22. The cover member 36 may be fabricated from any suitable material. For example, according to various embodiments, the cover member 36 is fabricated from glass lined tubing. The cover member 36 can prevent sharp edges of the wheel 12 from abrading or tearing the elastomeric fastener 22 and reducing its overall performance. FIG. 9D illustrates an elastomeric fastener 22 which may be utilized in lieu of the elastomeric fasteners shown in FIGS. 9A-9C. For the embodiments shown in FIG. 9D, as opposed to the first and second end portions being male portions as shown in FIGS. 9A-9C, the first and second end portions are female portions similar to those shown in FIGS. 6A, 6B and 7, with each end portion defining an opening therethrough.

Figure 10:
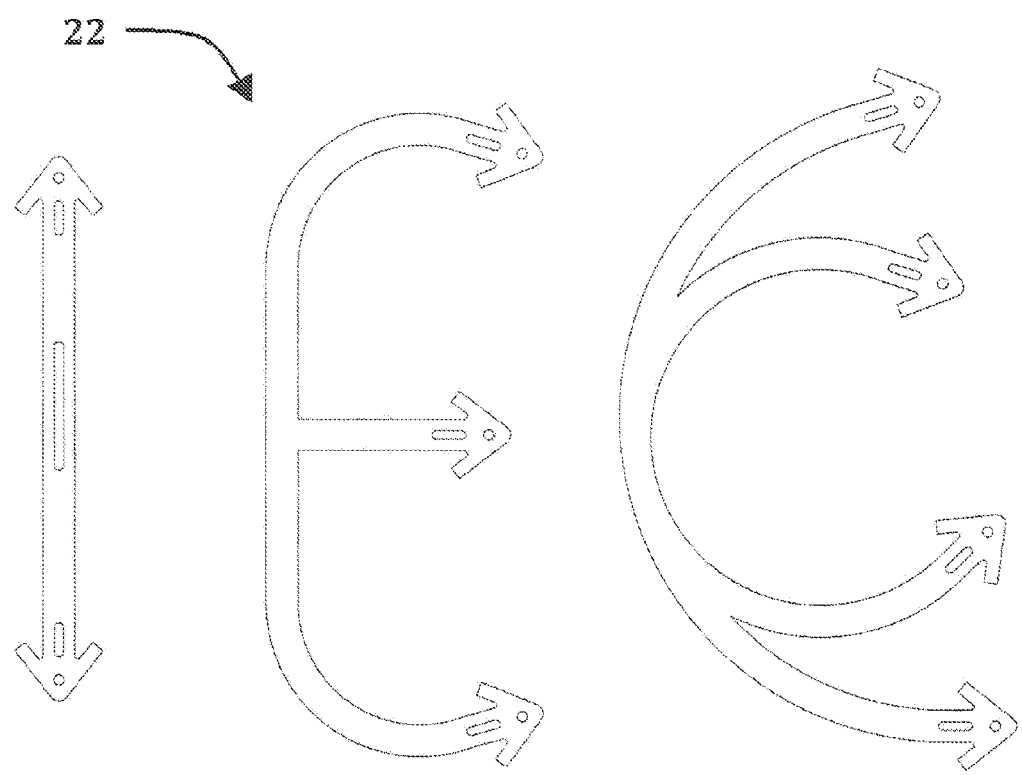
FIG. 10 illustrates various embodiments of the elastomeric fasteners of the fastener system of the system of FIG. 2.

FIG. 10 illustrates elastomeric fasteners 22 having four heads, three heads and two heads according to various embodiments. For embodiments with multiple "A" heads, it will be appreciated that fewer individual elastomeric fasteners 12 are required to connect the wheel protection device 18 to the wheel 12. It will be appreciated that the geometry of the elastomeric fasteners 22 can be easily modified since the elastomeric materials employed can be easily cut to unique designs to accommodate a wide range of application requirements.

Figure 11:
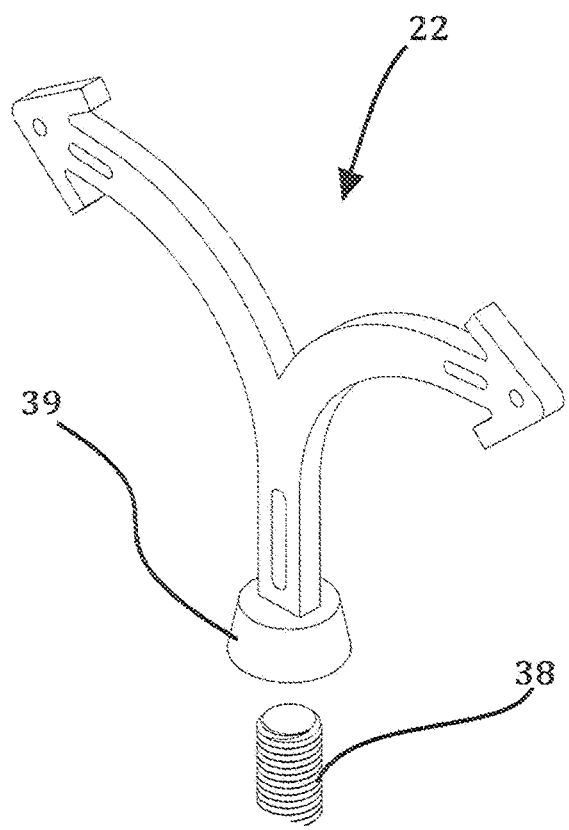
FIG. 11 illustrates various embodiments of the elastomeric fasteners of the fastener system of the system of FIG. 2.

FIG. 11 illustrates an elastomeric fastener 22 which can be attached at one end to a threaded stud 38 of a wheel 12, and has "A"-shaped heads at two other ends of the fastener 22. For the embodiments shown in FIG. 11, the end of the fastener 22 attached to the threaded stud 38 may be considered a base portion of the fastener 22 and includes and/or defines a threaded receptacle 39 which is configured to threadedly engage with the threads of the threaded stud 38. For purposes of simplicity, the "interior" of the threaded receptacle 39, which threadedly engages with the threaded stud 38, is not shown in FIG. 11.

Figure 12:
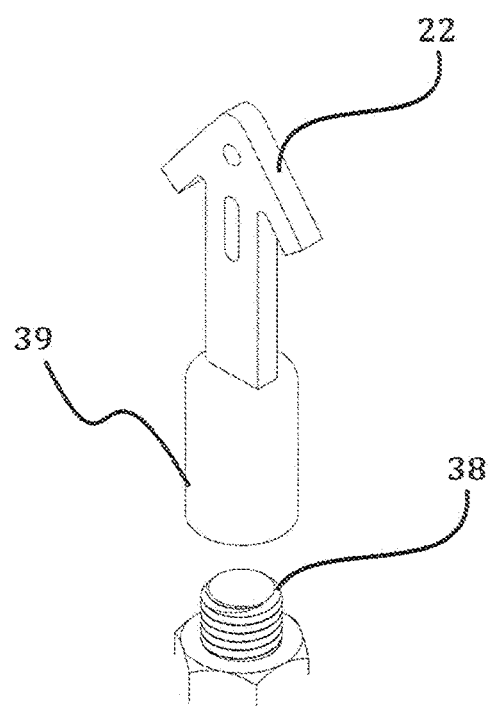
FIG. 12 illustrates various embodiments of the elastomeric fasteners of the fastener system of the system of FIG. 2.

FIG. 12 illustrates other embodiments of an elastomeric fastener 22 which can be attached at one end to a threaded stud 38 of a wheel 12. The elastomeric fastener 22 of FIG. 12 is similar to the elastomeric fastener 22 of FIG. 11, but is different in that the elastomeric fastener 22 of FIG. 12 only includes one "A"-shaped head.

Figure 13:
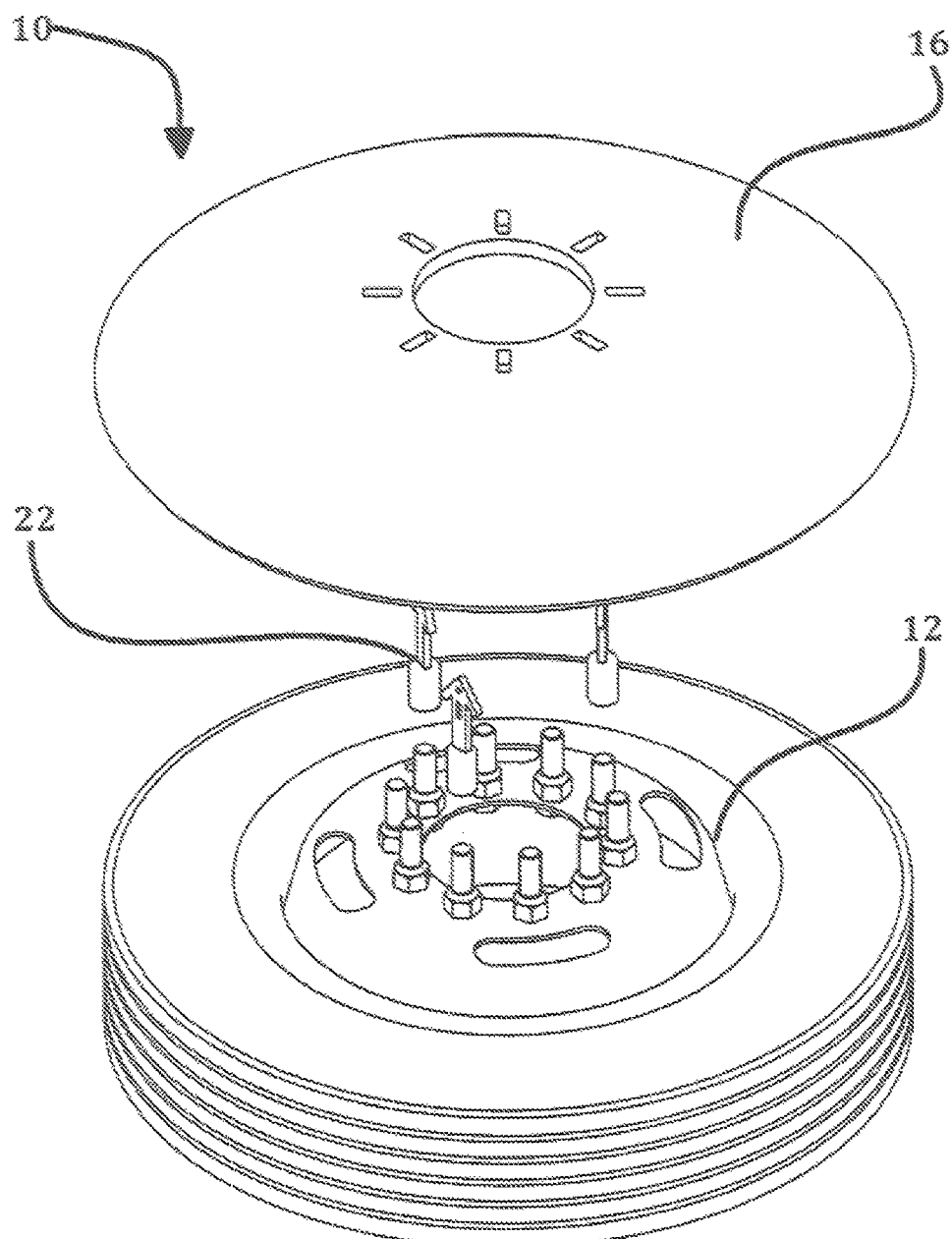
FIG. 13 illustrates an exploded view of the system of FIG. 2 according to various embodiments.

FIG. 13 illustrates an exploded view of how the elastomeric fastener 22 of FIG. 12 can be utilized to connect the protective device 16 to the wheel 12. The alternative geometrical designs and features described hereinabove for the tire shield embodiment of the protective device 16 are directly applicable to a wheel cover or other protective device.

Figure 14:
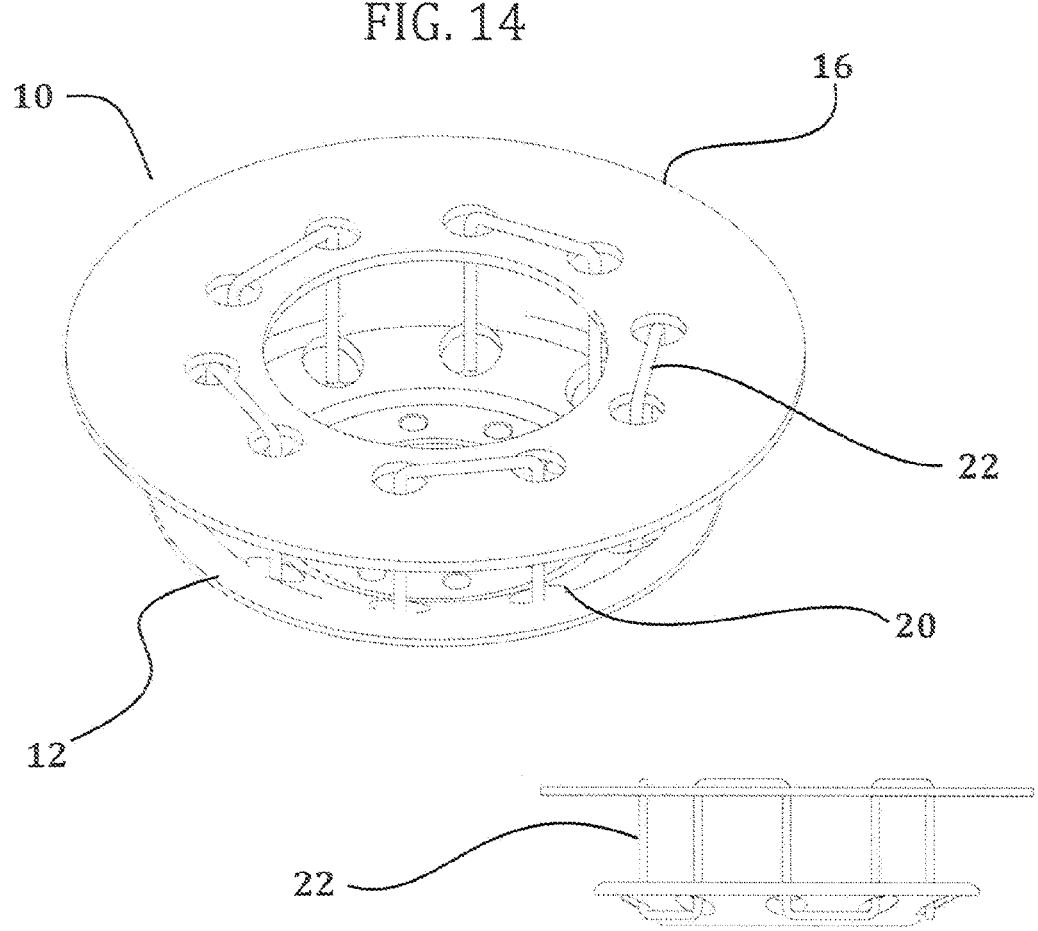
FIGS. 14-16 illustrates various embodiments of the fastener system of the system of FIG. 2.
Figure 15:
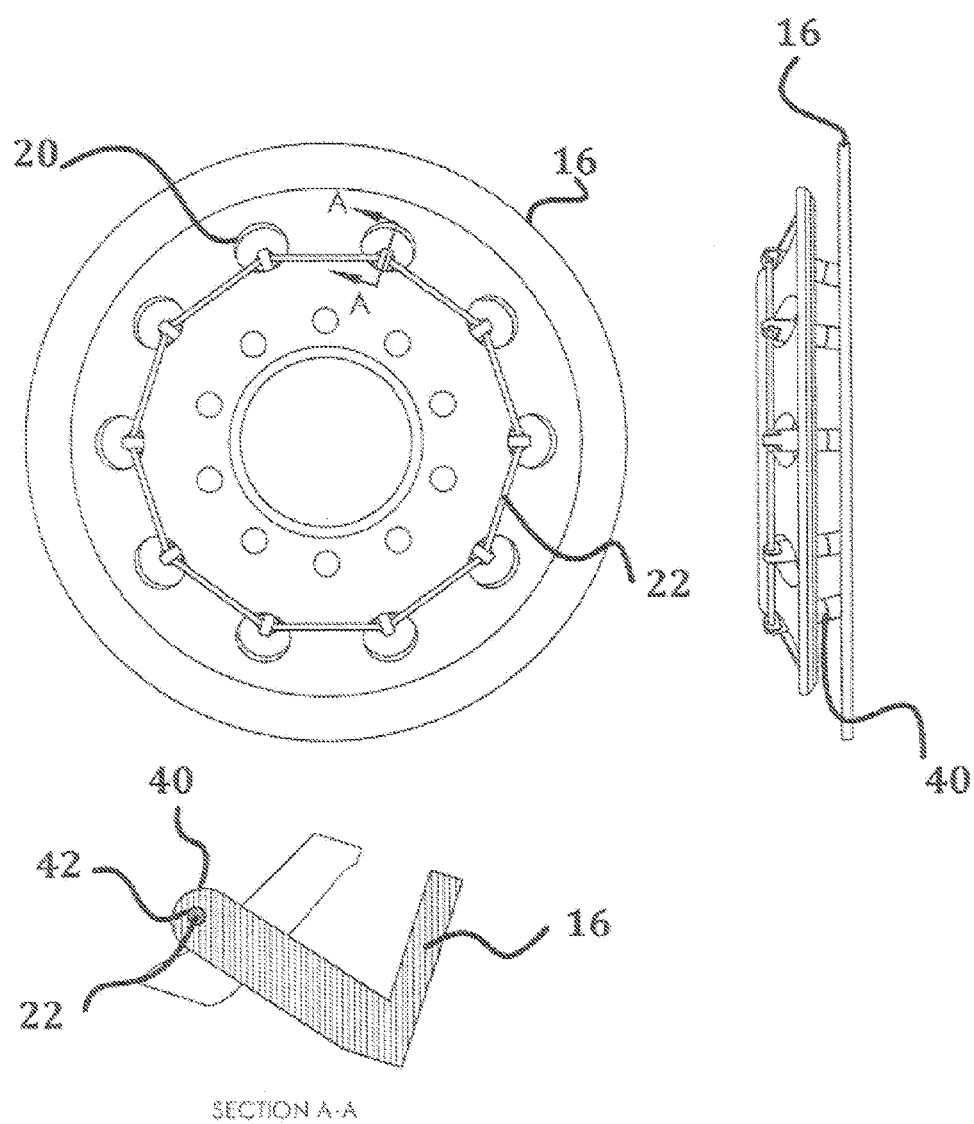
Figure 16:
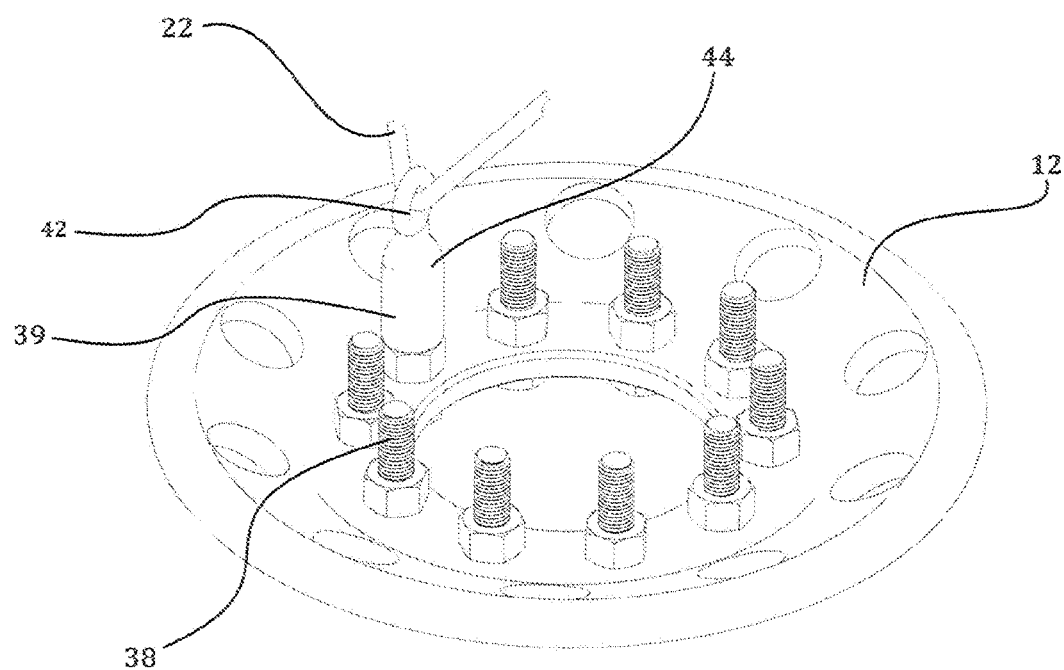

FIGS. 14-16 illustrate yet other embodiments of the fastener system 18. As shown in the perspective view and side view of FIG. 14, according to various embodiments, the fastener system 18 may utilize a single elastomeric fastener 22 configured in a continuous "shoe-string" arrangement. For these embodiments, the elastomeric "shoe-string" fastener 22 is attached through the mounting holes of the protective device 16 and then through the lightening holes 20 of the wheel 12 in a continuous band. The elastomeric fastener 22 can be wound, cut and tied to achieve the correct tension and length. The use of a continuous "shoe-string" band allows for a simplified design and eliminates the need for multiple elastomeric fasteners 22.

As shown in the plan view, side view and cross-section of FIG. 15, according to various embodiments, the fastener system 18 may further include a mounting peg 40. One end of the mounting peg 40 is fastened or molded into the protective device 16, and another end of the mounting peg 40 is designed to pass through the lightening hole 20 of the wheel 12 and defines an eyelet/opening 42 through which the elastomeric "shoe-string" fastener 22 can be fed. The tension of the fastener 22 can be adjusted to provide the desired elongation and tensioning force.

As shown in FIG. 16, according to various embodiments, the fastener system 18 may further include an eyelet member 44. One end of the eyelet member 44 includes a threaded receptacle 39 configured to threadedly engage with a threaded stud 38 of a multi-piece wheel 12. The other end of the eyelet member 44 defines an eyelet/opening 42 through which the elastomeric "shoe-string" fastener 22 can be fed. The tension of the fastener 22 can be adjusted to provide the desired elongation and tensioning force. For purposes of simplicity, the "interior" of the threaded receptacle 39, which threadedly engages with the threaded stud 38, is not shown in FIG. 16.

Figure 17:
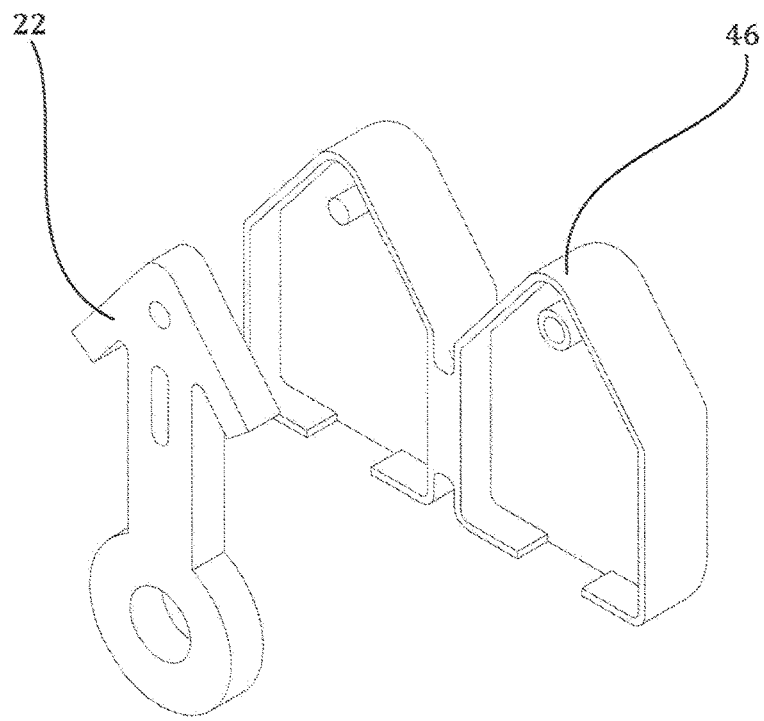
FIG. 17 illustrates various embodiments of a snap button utilized with the elastomeric fasteners of the fastener system of the system of FIG. 2.
Figure 18:
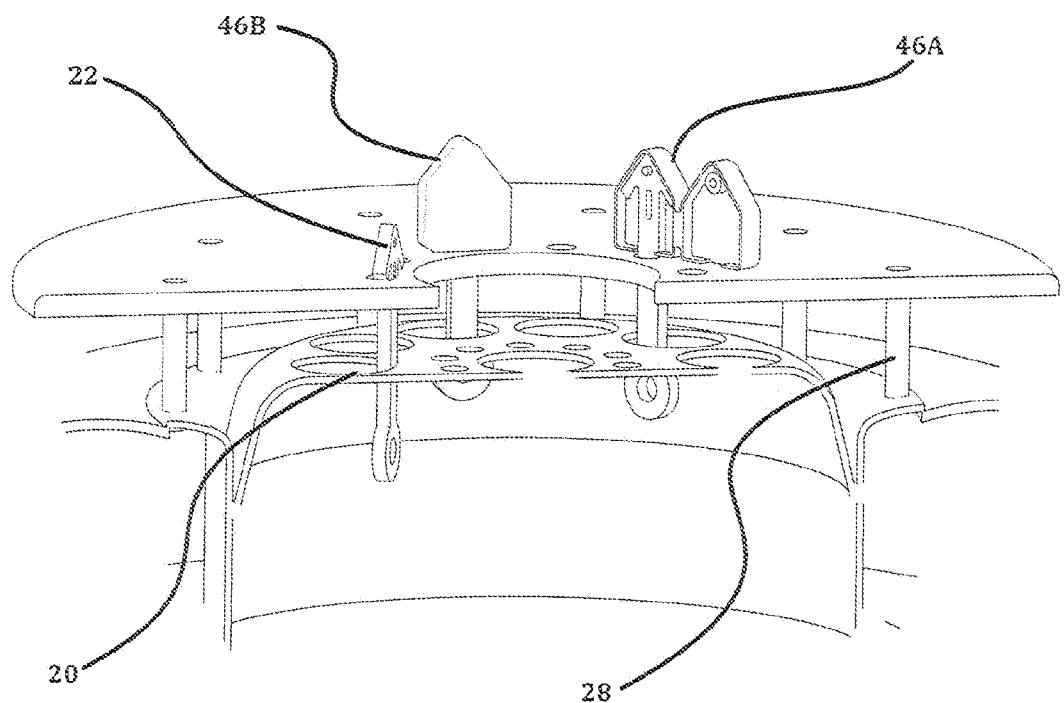
FIG. 18 illustrates an installed snap button of FIG. 17 according to various embodiments of the system of FIG. 2.

FIG. 17 illustrates a "snap button" 46 which can be connected to an "A" head of the elastomeric fastener 22 to enhance the visual appearance of the exposed "A" head. According to various embodiments, the snap button 46 includes a post which is inserted through an opening of the "A" head and into a receptacle of the snap button 46, thereby securing the elastomeric fastener 22 to the snap button 46. The snap button 46 may also function as a security catch which operates to protect the "A" head of the elastomeric fastener 22, reduce the chances of the elastomeric fastener 22 becoming disengaged during vehicle operation, and further securing the wheel protective device 16 to the wheel 12. The snap button 46 may be fabricated from any suitable material. For example, according to various embodiments, the snap button 46 is fabricated from a non-metallic material such as a plastic. FIG. 18 shows two of the snap buttons 46 installed in place, one open (46A) and one closed (46B).

Figure 19:
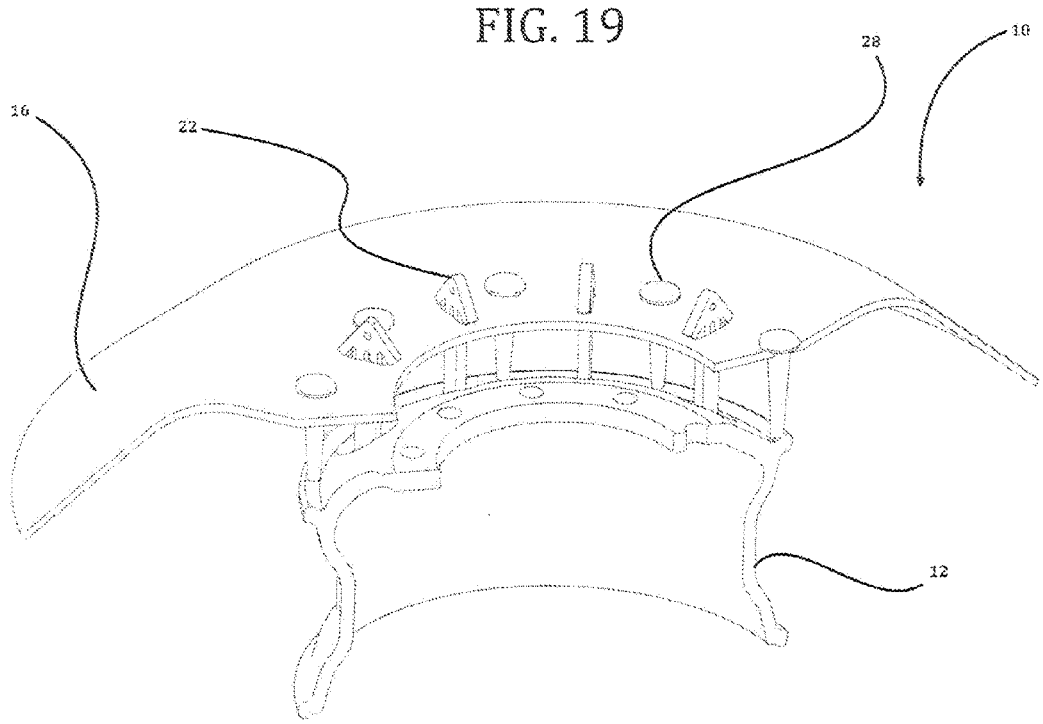
FIGS. 19 and 20 illustrate self-aligning locating standoff pegs utilized with a wheel protective device according to various embodiments.
Figure 20:
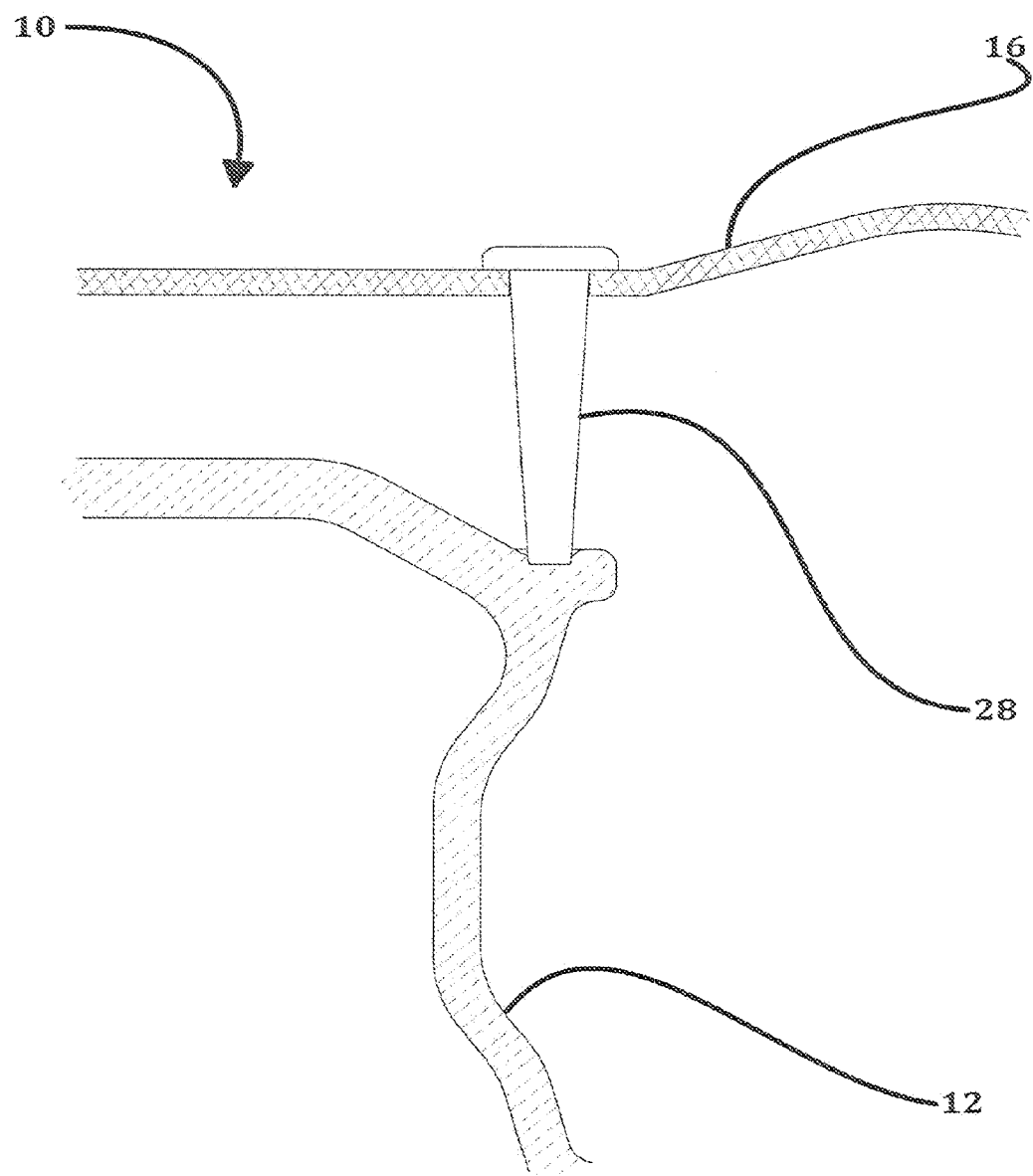

FIGS. 19 and 20 illustrate self-aligning locating standoff pegs 28 utilized with a wheel protective device 16 (e.g., a tire shield) according to various embodiments. The standoff pegs 28 are utilized to improve performance of the fastener system 18. The standoff pegs 28 facilitate multiple mounting features including, (1) offset of the wheel protective device 16 from the tire, (2) centering of the wheel protective device 16 onto the wheel and (3) self-centering of the wheel protective device 16 following a collision event. The standoff pegs 28 may be fabricated from any suitable material. For example, according to various embodiments, the standoff pegs 28 comprise a durable rubber or plastic material. According to other embodiments, the standoff pegs 28 comprise a metal or other durable material. As shown in FIG. 19, a plurality of standoff pegs 28 may be inserted in the protective device 16 and abutted against the flange of the wheel 12 to provide "mechanical stops" that minimize un-wanted movement during collision events. A more detailed view of this is shown in FIG. 20. The standoff pegs 28 also allow the protective device 16 to automatically re-center on the wheel 16 following a collision event. These standoff pegs 28 also provide a means for offsetting the protective device 16 away from the vehicle tire 14 to prevent unwanted interference with the tire 14. These locating standoff pegs 28 may be press fit and snapped, or bolted into place on the protective device 16 at multiple locations. The standoff pegs 28 can also be integrated (molded) directly into the protective device 16. In view of the above, it will be appreciated that the standoff pegs 28 provide for controlled axial displacement of the protective device 16 relative to the wheel 12 in the z direction.

Figure 21:
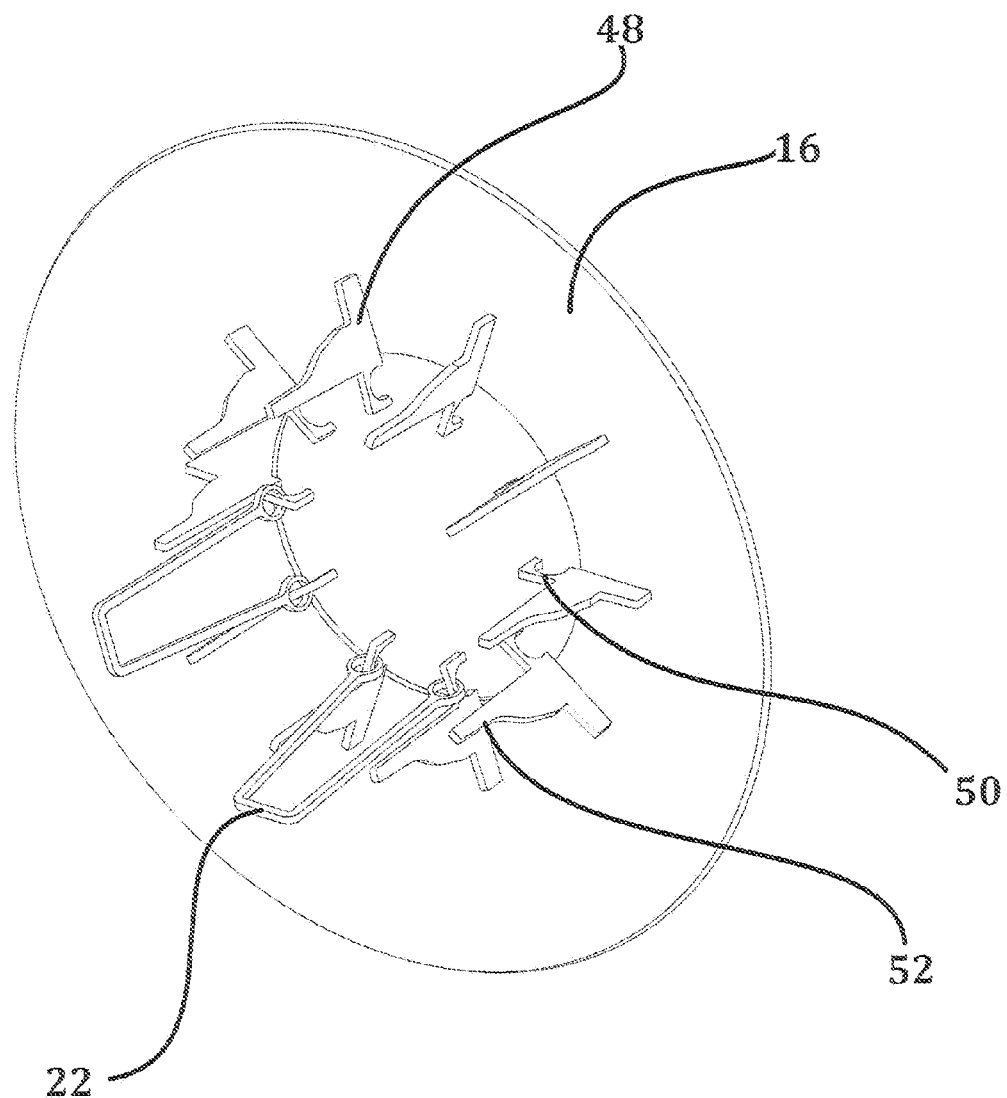
FIGS. 21 and 22 illustrate self-aligning locating standoff members utilized with a wheel protective device according to various embodiments.
Figure 22:
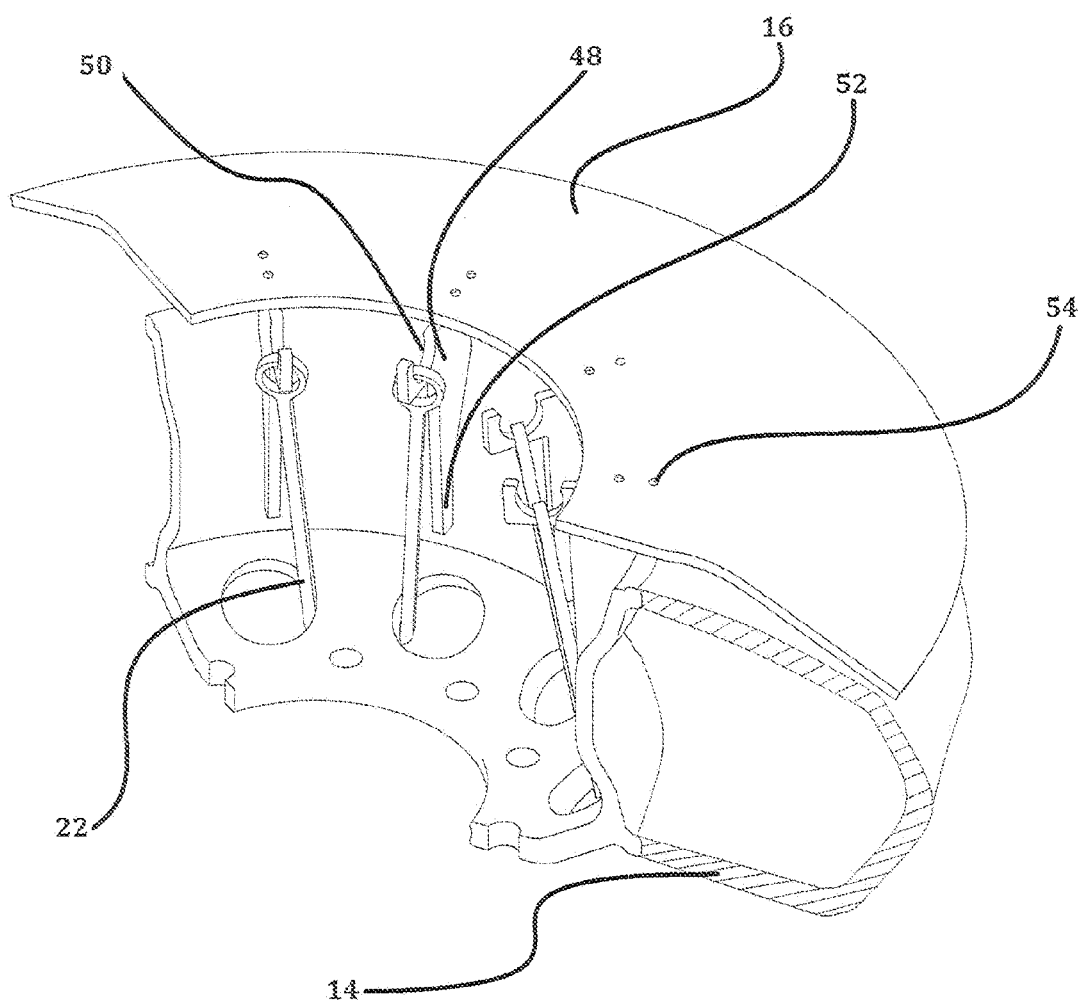
Figure 23:
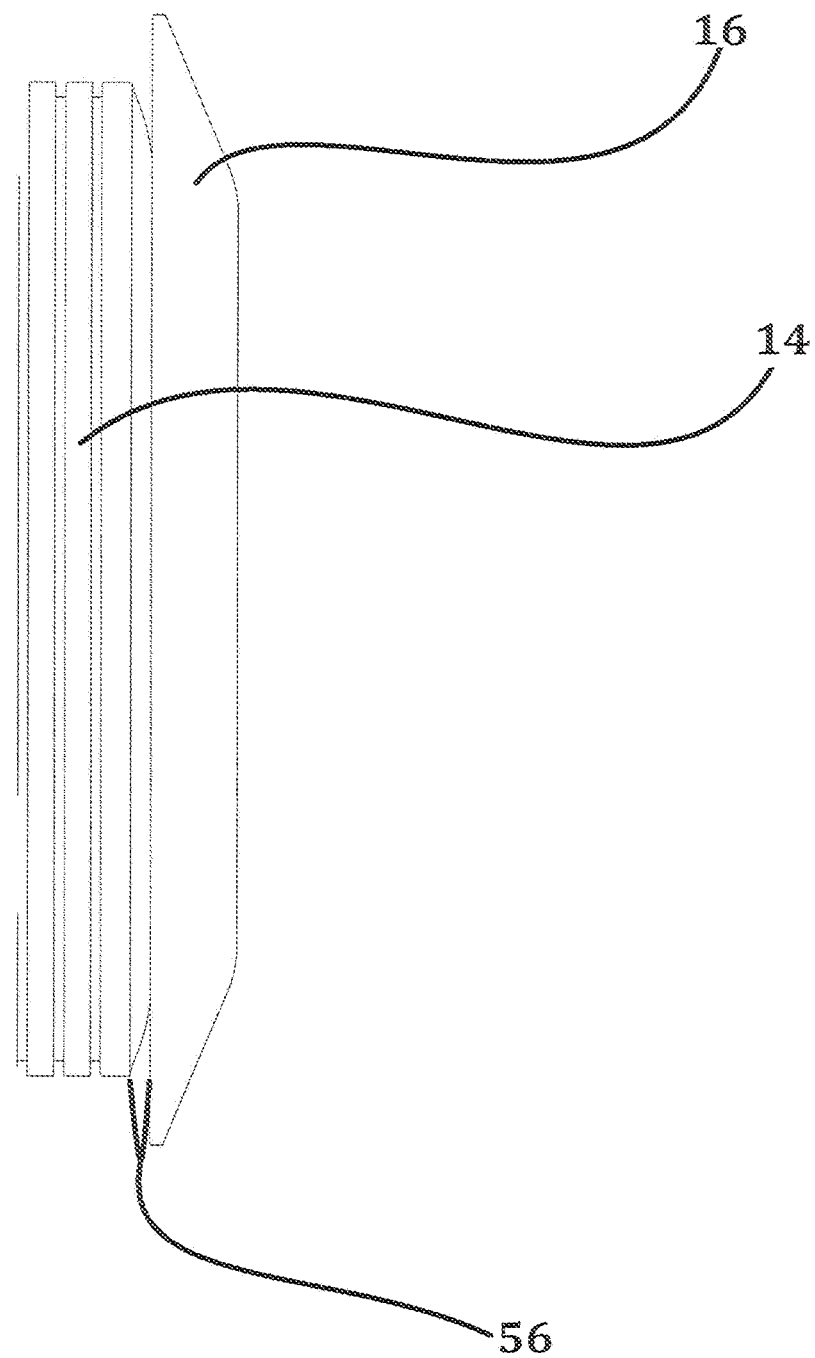
FIG. 23 illustrates a top view of a gap between a tire and a tire shield.

FIGS. 21-23 illustrate self-aligning locating standoff members 48 utilized with a wheel protective device 16 (e.g., a tire shield) according to other embodiments. The standoff members 48 are similar to the standoff pegs 28 and may be fabricated from any suitable material, but are generally more rugged and robust than the standoff pegs 28. The standoff members 48 are generally fabricated from a "thicker" and stronger material than the standoff pegs 28. For example, according to various embodiments, the standoff members 48 are fabricated from a high density polyethylene (HPDE). The standoff members 48 are also different in that each standoff member 48 defines a notch 50 and a finger 52. The notch 50 can provide a more secure attachment point for the elastomeric fastener 22 and the finger 52 can ride on the inside of the wheel hub when the standoff member 48 is installed. Although the standoff pegs 28 of FIGS. 19 and 20 are suitable for many applications, for more demanding applications such as mounting of a large tire shield 16 to a truck wheel 12, the more rugged standoff members 48 may be utilized. The standoff members 48 cooperate with one another to effectively self-center the tire shield 16 after collision events while ensuring that the tire shield 16 cannot ride "high" on the tire 14 or abrade the tire 14. In view of the above, it will be appreciated that the standoff members 48 provide for controlled axial displacement of the protective device 16 relative to the wheel 12 in the z direction.

FIG. 21 shows the standoff members 48 fabricated from the thicker and stronger HPDE, and also shows the notches 50 and the fingers 52. In FIG. 22, the standoff members 48 are mounted to the tire shield 16 with fasteners 54 (e.g., screws) to minimize the chance a given standoff member 48 can loosen, come loose or become disengaged from the tire shield 16 during operation of the vehicle. As shown in FIG. 22, the finger 52 of each standoff member 48 is geometrically designed/configured to ride on the inside of the wheel hub.

FIG. 23 illustrates a side view of a gap 56 between a tire 14 and a tire shield 16. In FIG. 23, although the standoff members 48 are hidden from view, one can appreciate how the more robust and rugged standoff member 48 is effective in consistently maintaining proper clearance between the tire shield 16 and the tire 14 (depicted as gap 56). During a collision event, the more robust standoff members 48 provide enhanced self-centering while minimizing any chance of the tire shield 16 interfering with, abrading or damaging the tire 14.

Figure 24:
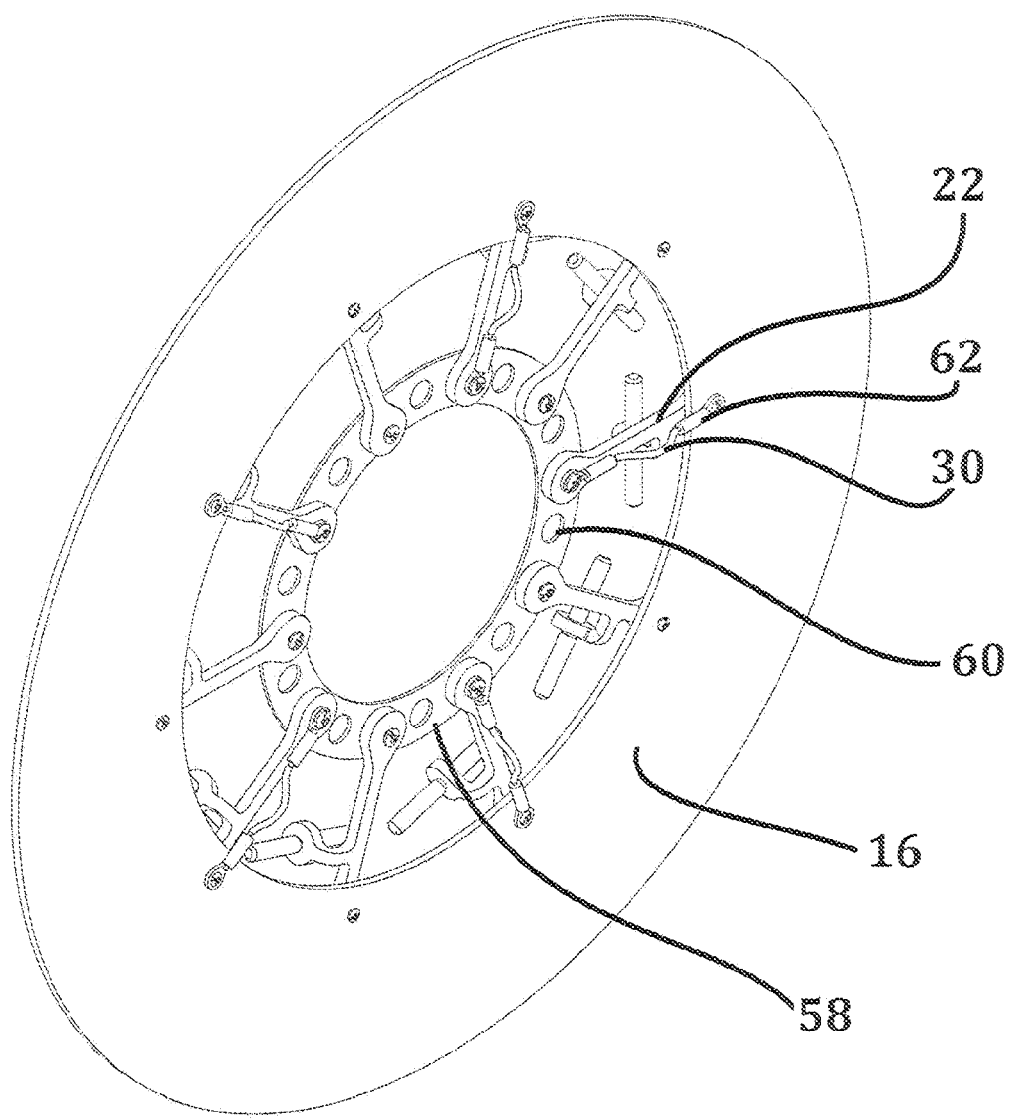
FIG. 24 illustrates other embodiments of a fastener system of the system of FIG. 2.
Figure 25:
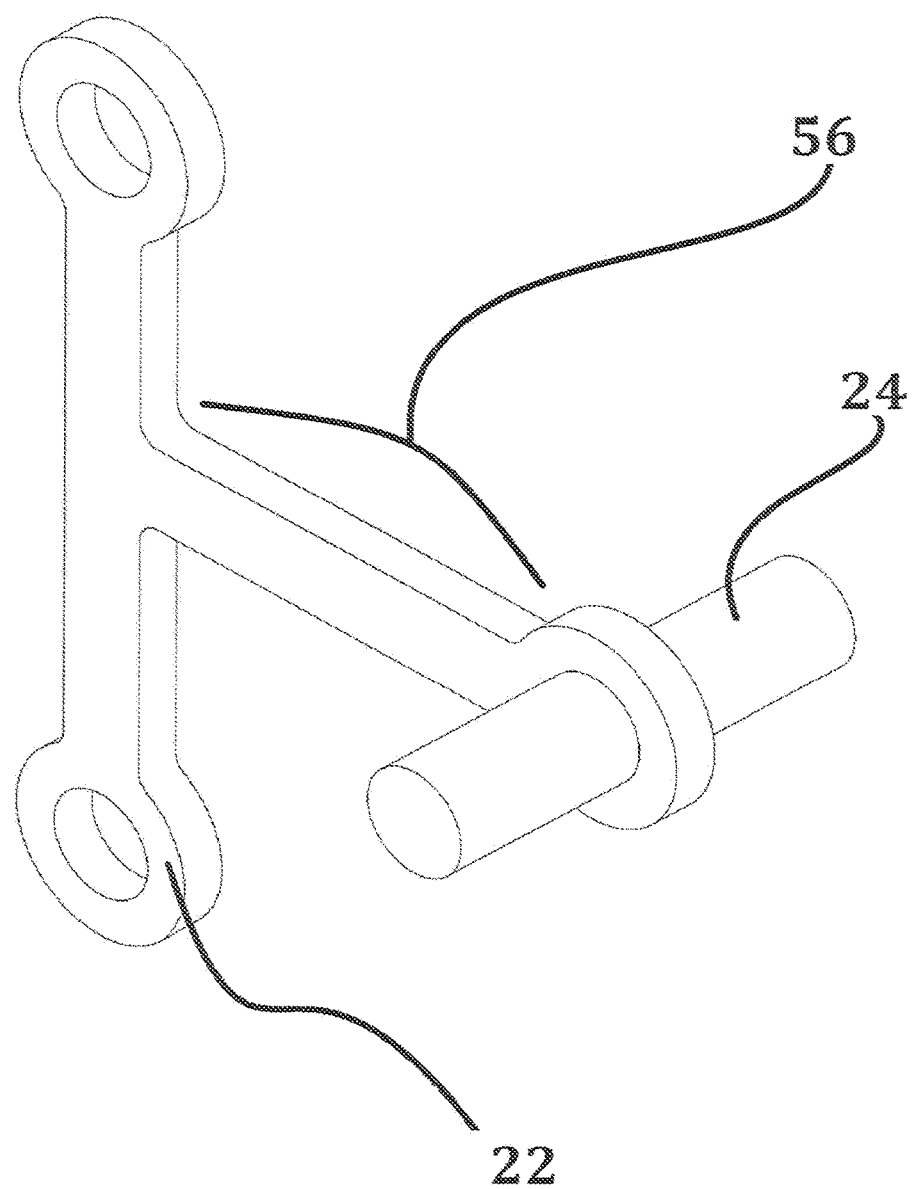
FIG. 25 illustrates various embodiments of an elastomeric fastener of the fastener system of FIG. 24.

FIG. 24 illustrates other embodiments of the fastener system 18. For some wheel geometries, the fastener system 18 shown in FIG. 24 is better suited than the other embodiments of the fastener system 18 described hereinabove. For the embodiments shown in FIG. 24, the fastener system 18 includes the elastomeric fasteners 22, the retainer rods 24, and an adaptor ring member 58 which defines openings 60 therethrough. An exemplary elastomeric fastener 22 and associated retainer rod 24 is shown in FIG. 25. According to various embodiments, the fastener system 18 may also include the cover member 26. By aligning the openings 60 with the lug bolts (e.g., threaded stud 38) of the wheel 12, the adapter ring member 58 can be mounted over the lug bolts of the wheel 12 and under the lug nuts. For purposes of simplicity, the wheel 12, the lug bolts and the lug nuts are not shown in FIG. 24. The adapter ring member 58 may be of any suitable material. For example, according to various embodiments, the adapter ring member 58 comprises a plastic (e.g., nylon) or a metal (e.g., aluminium, steel, etc.).

For the embodiments shown in FIG. 24, the elastomeric fasteners 22 are "T" shaped. The fastener 22 for these embodiments can serve dual purposes. First, the fastener 22 connects the protective device 16 to the wheel 12 using the adaptor ring member 58. Second, the fastener 22 also allows the protective device 16 to be mounted at a fixed and controlled gap 56 (See FIG. 23) from the wheel 12. The leg of the "T" shaped elastomeric fastener 22 fits through the lightening hole 20 and is affixed to the wheel 12 with a retainer rod 24 as described earlier. The length of the "T" shaped leg sets a controllable distance between the protective device 16 and the wheel 12 (e.g., See gap 56 in FIG. 25). As shown in FIG. 24, an end of one of the arms of the "T" shaped fastener 22 is connected to the adapter ring member 58, and an end of the other arm of the "T" shaped fastener 22 is connected to the protective device 16. For these embodiments, the elastomeric fastener 22 effectively also serves as a stand-off.

According to various embodiments, the fastener system 18 may also include an extension limiting apparatus 62 which includes the extension limiting member 30 which can operate to prevent overextension of the elastomeric fastener 22. As shown in FIG. 24, the extension limiting member 62 is external to the elastomeric fastener 22 and is connected to the protective device 16, the elastomeric fastener 22 and the adapter ring member 58. The elastomeric fastener 22 and the extension limiting apparatus 62 may be connected to one another and to the protective device 16 and the adapter ring member 58 in any suitable manner. For example, according to various embodiments, the ring adapter member 58 may include threaded male studs which extend axially outward from the ring adapter member 58. For a given elastomeric fastener 22, the elastomeric fastener 22 is positioned such that one of the threaded male studs of the adapter ring member 58 extends into the opening of one of the ends of the elastomeric fastener 22. An opening at one end of a corresponding extension limiting apparatus 62 is then positioned over the male stud, and an internally threaded fastener (e.g., a self-clinching nut) is then installed in an axially inward direction, threadedly engaging with the threaded male stud and thereby securing the elastomeric fastener 22 and the extension limiting apparatus 62 to the ring adapter member 58, as well as to each other. At the protective device 16, an internally threaded fastener (e.g., a self-clinching nut) may be passed axially outward through an opening at another end of the elastomeric fastener 22, through the protective device 16, and into an opening at another end of the extension limiting apparatus 62 which is positioned on the outboard side of the protective device 16. A threaded fastener is then installed in an axially inward direction, threadedly engaging with the internally threaded fastener and thereby securing the elastomeric fastener 22 and the extension limiting apparatus 62 to the protective device 16, as well as to each other.

In view of the above, it will be appreciated that the fastener system 18 provides for ease of field mounting and repair. The lighter weight of the elastomeric fasteners 22 makes the fastener system 18 easier to lift and easier to assemble. In many instances, no tools are needed for the installation of the fastener system 18, and even without having any prior familiarity of the fastener system 18, a person can typically assembly (and disassemble) the fastener system 18 in about 5-10 minutes. In some applications, the use of a screwdriver can make the assembly even easier and faster. The effectiveness of the fastener system 18 reduces the impact and abrasion forces absorbed by the wheel protective devices 16. The elastomeric fasteners 22 allow greater flexibility in the selection of materials and manufacturing method. This ultimately makes the fastener system 18 more economic for manufacture of a smaller number of production units.

The use of the elastomeric fasteners 22 compensates for variation in radial and rotational displacement between the wheel 12 and the tire shield 16 and thereby improves tire shield to curb performance by minimizing shield "buckling" and deflection during collision events. Similar performance advantages would occur for wheel covers 16. The design of the fastener system 18 resists permanent deformation of all its components, is self-aligning and returns to center automatically. The elastomeric fastener 22 allows curbs to be hit repeatedly without catastrophic hardware and/or shield damage. All weather materials provide consistency in hot and cold weather as well as dry versus wet.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of or exceeding the scope of, the described and/or claimed invention. Accordingly, it is understood that the drawings and the descriptions herein are proffered only to facilitate comprehension of the invention and should not be construed to limit the scope thereof.

What is claimed is:

1. A system, comprising:
   a wheel having a tire mounted thereon;
   a tire shield configured to protect a sidewall of said tire from damage; and
   a fastener system connected to the wheel and the tire shield, wherein the fastener system comprises:
   a standoff member coupled to the wheel and the tire shield, wherein the standoff member comprises a high density polyethylene and is configured to offset the tire shield from the tire;
   an elastomeric fastener coupled to the standoff member and the wheel, wherein the elastomeric fastener comprises an ethylene propylene diene monomer rubber; and
   an extension limiting member configured to prevent overextension of the elastomeric fastener,
   wherein the fastener system is configured to allow for controlled radial and rotational displacement of the tire shield relative to the wheel in x and y directions while the wheel is rotating during collision event involving the tire shield.

2. The system of claim 1, wherein the fastener system comprises a plurality of elastomeric fasteners.

3. The system of claim 1, wherein the extension limiting member is embedded within the elastomeric fastener.

4. The system of claim 1, wherein the extension limiting member is one of the following:
   a metal wire; and
   an inelastic fabric.

5. The system of claim 1, wherein the extension limiting member is external to the elastomeric fastener.

6. The system of claim 5, wherein the extension limiting member is an inelastic fabric sleeve, wherein the elastomeric fastener is positioned within the inelastic fabric sleeve.

7. The system of claim 5, wherein the extension limiting member comprises a portion of an extension limiting apparatus.

8. The system of claim 1, wherein the fastener system further comprises a retainer rod, wherein the retainer rod is surrounded by a portion of the elastomeric fastener and is in contact with the wheel.

9. The system of claim 8, wherein the fastener system further comprises a cover member, wherein the cover member surrounds the retainer rod.

10. The system of claim 1, wherein the fastener system further comprises a cover member, wherein the cover member surrounds a portion of the elastomeric fastener.

11. The system of claim 1, wherein the fastener system further comprises an eyelet member, wherein the eyelet member:
    defines an eyelet which surrounds the elastomeric fastener; and
    is threadedly engaged with a stud which passes through the wheel.

12. The system of claim 1, wherein the fastener system further comprises a snap button, wherein the snap button is configured to receive an end of the elastomeric fastener and is in contact with the tire shield.

13. The system of claim 1, further comprising an adapter ring member, wherein the adapter ring member is connected to the wheel, the tire shield and the elastomeric fastener.

14. The system of claim 1, wherein the elastomeric fastener comprises:
    a first end portion;
    a second end portion; and
    a body portion connected to the first and second end portions.

15. The system of claim 14, wherein the body portion comprises at least one kinked portion.

16. The system of claim 14, wherein at least one of the following:
    the first end portion defines an opening therethrough;
    the second end portion defines an opening therethrough; and
    the body portion defines an opening therethrough.

17. The system of claim 14, wherein:
    the first end portion is proximate the wheel; and
    the second end portion is proximate the tire shield.

18. The system of claim 14, wherein:
    the first end portion is proximate the tire shield;
    the second end portion is proximate the tire shield; and
    at least part of the body portion is proximate the wheel.

19. The system of claim 14, wherein the elastomeric fastener further comprises a third end portion, wherein the third end portion defines a threaded receptacle and is threadedly engaged with a stud which passes through the wheel.

20. The system of claim 1, wherein the elastomeric fastener flexes over an extended range of elongation from −20° F. to 180° F.

21. The system of claim 1, wherein the fastener system is further configured to allow for controlled axial displacement of the tire shield relative to the wheel in the z direction.

\* \* \* \* \*